(12) United States Patent
Hwang et al.

(10) Patent No.: US 12,464,547 B2
(45) Date of Patent: Nov. 4, 2025

(54) METHOD FOR PERFORMING SIDELINK COMMUNICATION IN UNLICENSED BAND BY UE IN WIRELESS COMMUNICATION SYSTEM AND APPARATUS THEREFOR

(71) Applicant: LG ELECTRONICS INC., Seoul (KR)

(72) Inventors: Daesung Hwang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 419 days.

(21) Appl. No.: 18/080,332

(22) Filed: Dec. 13, 2022

(65) Prior Publication Data

US 2023/0300862 A1 Sep. 21, 2023

(30) Foreign Application Priority Data

Mar. 18, 2022 (KR) .................. 10-2022-0034225

(51) Int. Cl.
*H04W 72/40* (2023.01)
*H04W 16/14* (2009.01)
*H04W 72/0453* (2023.01)
*H04W 72/232* (2023.01)

(52) U.S. Cl.
CPC .......... *H04W 72/40* (2023.01); *H04W 16/14* (2013.01); *H04W 72/0453* (2013.01); *H04W 72/232* (2023.01)

(58) Field of Classification Search
CPC . H04W 72/40; H04W 16/14; H04W 72/0453; H04W 72/232; H04W 72/23; H04W 72/02; H04W 72/25; H04W 72/1263; H04W 92/01; H04L 5/0053; H04L 5/0094; H04L 27/0006; H04L 5/0039; H04L 1/1812
See application file for complete search history.

(56) References Cited

U.S. PATENT DOCUMENTS

2022/0393807 A1* 12/2022 Xue ............... H04W 72/23

FOREIGN PATENT DOCUMENTS

| KR | 20210024191 A | 3/2021 |
| WO | 2021237654 A1 | 12/2021 |

\* cited by examiner

*Primary Examiner* — Dady Chery
(74) *Attorney, Agent, or Firm* — BRYAN CAVE LEIGHTON PAISNER LLP

(57) ABSTRACT

Disclosed are a method of transmitting a sidelink signal in an unlicensed band by a first UE in a wireless communication system for supporting sidelink communication and an apparatus therefor. The method includes receiving configuration information for a resource pool allocated for the unlicensed band, and transmitting the sidelink signal based on sub-channels included in the resource pool, wherein the sidelink signal includes at least one of a Physical Sidelink control Channel (PSCCH), a Physical Sidelink Shared Channel (PSSCH), or a Physical Sidelink Control Channel (PSFCH), and the unlicensed band includes a plurality of resource block sets, and the sub-channels are independently allocated for each of the plurality of resource block sets.

9 Claims, 23 Drawing Sheets

FIG. 6
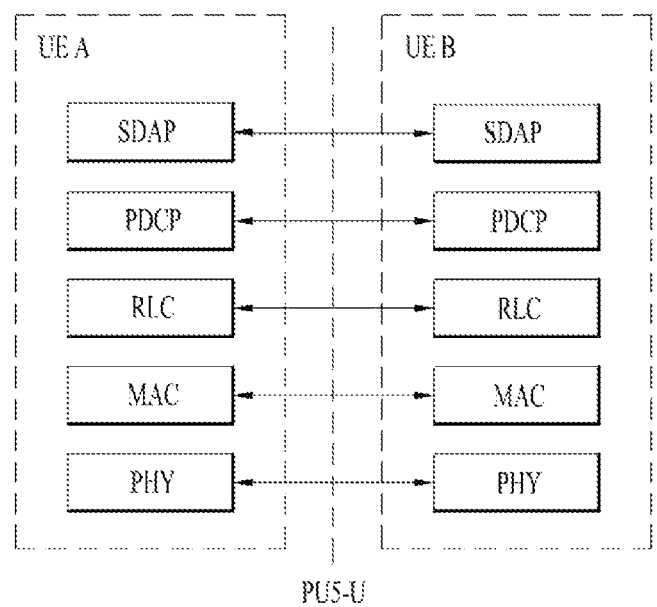
(a)
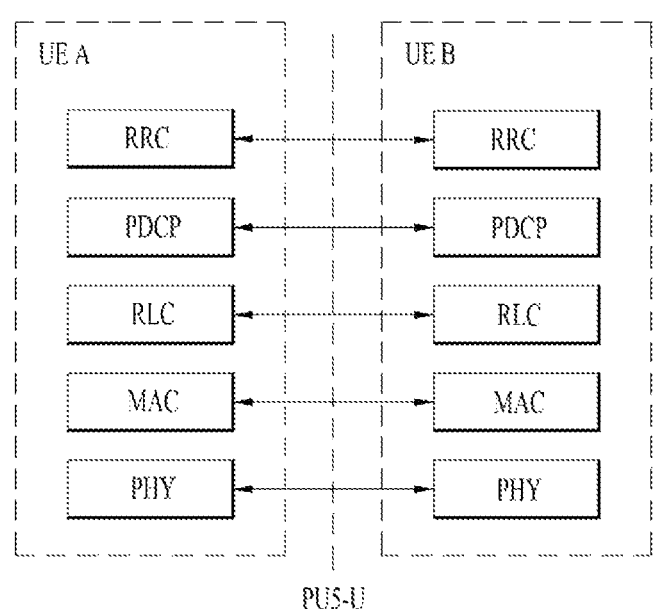
(b)

FIG. 9
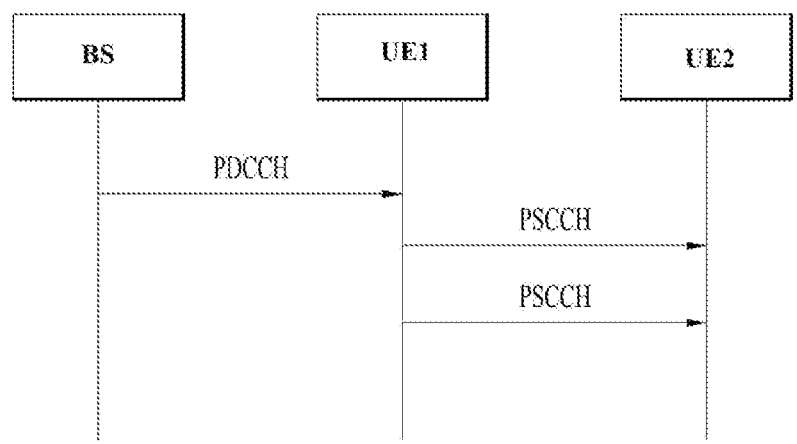
(a)
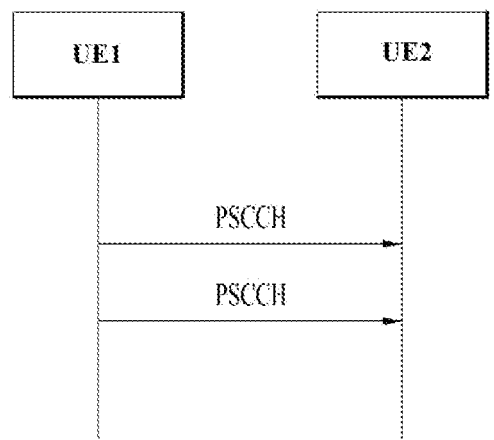
(b)

FIG. 10
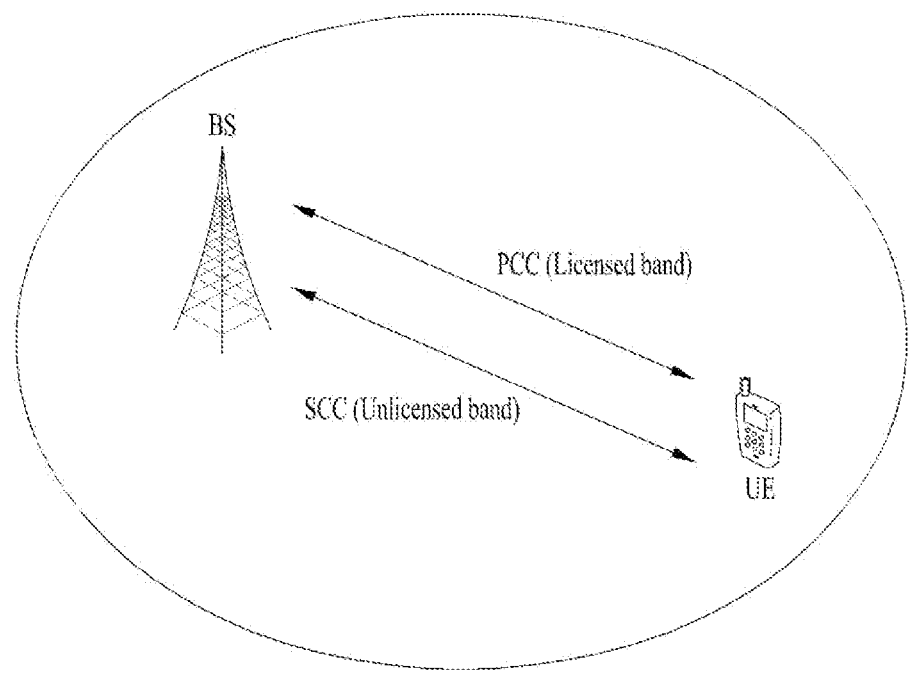
(a) Carrier aggregation between L-band and U-band
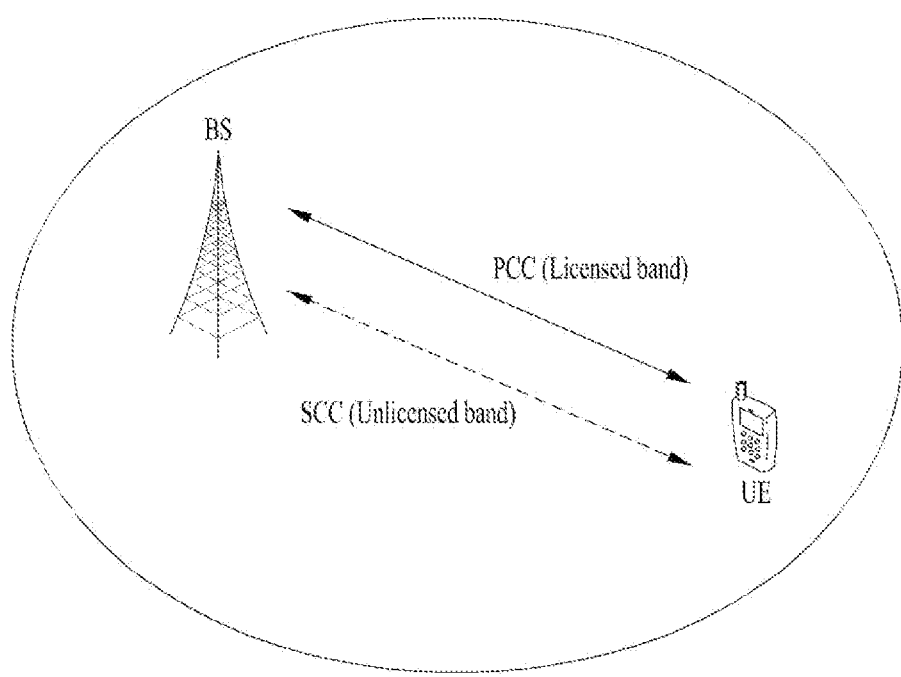
(b) Standalone U-band(s)

METHOD FOR PERFORMING SIDELINK COMMUNICATION IN UNLICENSED BAND BY UE IN WIRELESS COMMUNICATION SYSTEM AND APPARATUS THEREFOR

CROSS-REFERENCE TO RELATED APPLICATIONS

This application claims the benefit of Korean Patent Application No. 10-2022-0034225, filed on Mar. 18, 2022, which is hereby incorporated by reference as if fully set forth herein.

TECHNICAL FIELD

The present disclosure relates to a method of transmitting a sidelink signal in an unlicensed band by a user equipment (UE) in a wireless communication system and an apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

An object of the present disclosure is to provide a method and apparatus for transmitting a sidelink signal in an unlicensed band using a sub-channel with a predetermined size even if only some resource block sets are selected among a plurality of resource block sets included in the unlicensed band using a sensing operation by allocating a sub-channel for each resource block set for an unlicensed band and aligning a resource block set and the sub-channel.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

According to an aspect, a method of transmitting a sidelink signal in an unlicensed band by a first user equipment (UE) in a wireless communication system for supporting sidelink communication includes receiving configuration information for a resource pool allocated for the unlicensed band, and transmitting the sidelink signal based on sub-channels included in the resource pool, wherein the sidelink signal includes at least one of a Physical Sidelink control Channel (PSCCH), a Physical Sidelink Shared Channel (PSSCH), or a Physical Sidelink Control Channel (PSFCH), and the unlicensed band includes a plurality of resource block sets, and the sub-channels are independently allocated for each of the plurality of resource block sets.

Each of the sub-channels may be allocated not to overlap two or more resource block sets.

The resource pool may be allocated based on a frequency offset included in the configuration information.

The frequency offset may be an interval between start frequencies of sub-channels from a first resource block of a pre-configured resource block set among the plurality of resource block sets.

The sub-channels may be a remaining sub-channel except for a sub-channel overlapping two or more resource block sets among a plurality of sub-channels continuous on a frequency domain from the start frequency.

The configuration information may include information on a frequency offset for allocating the sub-channels for each resource block set.

The resource block set may include at least one remaining resource block to which the sub-channels are not allocated.

The first UE may transmit the sidelink signal using the remaining resource block as well based on that transmission of the sidelink signal is allowed only in a continuous frequency resource and both a first resource block set including the remaining resource block and a second resource block set adjacent to the remaining resource block are in an idle state.

The sub-channels may have the same frequency size.

According to another aspect, a method of configuring a resource pool for a sidelink signal in an unlicensed band by a base station (BS) in a wireless communication system for supporting sidelink communication includes transmitting resource information for the unlicensed band including a plurality of resource block sets, and transmitting configuration information for the resource pool allocated based on the resource information, wherein the resource pool includes sub-channels independently allocated for each of the plurality of resource block sets.

According to another aspect, a first user equipment (UE) for transmitting a sidelink signal in an unlicensed band in a wireless communication system for supporting sidelink communication includes a radio frequency (RF) transceiver, and a processor connected to the RF transceiver, wherein the processor controls the RF transceiver to receive configuration information for a resource pool allocated for the unlicensed band and to transmit the sidelink signal based on sub-channels included in the resource pool, and the unlicensed band includes a plurality of resource block sets, and the sub-channels are independently allocated for each of the plurality of resource block sets.

Each of the sub-channels may be allocated not to overlap two or more resource block sets.

According to another aspect, a base station (BS) for configuring a resource pool for an unlicensed band in a wireless communication system for supporting sidelink communication includes a radio frequency (RF) transceiver, and a processor connected to the RF transceiver, wherein the processor controls the RF transceiver to transmit resource information for the unlicensed band including a plurality of resource block sets and to transmit configuration information for the resource pool allocated based on the resource information, the resource pool is configured for at least one of a Physical Sidelink Shared Channel (PSSCH) or a Physical Sidelink Control Channel (PSFCH), and the resource pool includes sub-channels independently allocated for each of the plurality of resource block sets.

According to another aspect, a chip set for transmitting a sidelink signal in an unlicensed band in a wireless communication system for supporting sidelink communication includes at least one processor, and at least one memory operatively connected to the at least one processor and configured to cause the at least one processor to perform an operation when being executed, wherein the operation includes receiving configuration information for a resource pool allocated for the unlicensed band, and transmitting the sidelink signal based on sub-channels included in the resource pool, wherein the sidelink signal includes at least one of a Physical Sidelink control Channel (PSCCH), a Physical Sidelink Shared Channel (PSSCH), or a Physical Sidelink Control Channel (PSFCH), and the unlicensed band includes a plurality of resource block sets, and the sub-channels are independently allocated for each of the plurality of resource block sets.

According to another aspect, a computer-readable storage medium including at least one computer program for performing an operation of transmitting a sidelink signal in an unlicensed band in a wireless communication system for supporting sidelink communication includes at least one computer program, and a computer-readable storage medium for storing the at least one computer program therein, wherein the operation includes receiving configuration information for a resource pool allocated for the unlicensed band, and transmitting the sidelink signal based on sub-channels included in the resource pool, the sidelink signal includes at least one of a Physical Sidelink control Channel (PSCCH), a Physical Sidelink Shared Channel (PSSCH), or a Physical Sidelink Control Channel (PSFCH), and the unlicensed band includes a plurality of resource block sets, and the sub-channels are independently allocated for each of the plurality of resource block sets.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 6 illustrates a radio protocol architecture for SL communication.

FIG. 9 illustrates a procedure in which UEs perform V2X or SL communication according to a transmission mode.

FIG. 10 illustrates an exemplary wireless communication system supporting an unlicensed band.

DETAILED DESCRIPTION

Figure 1:
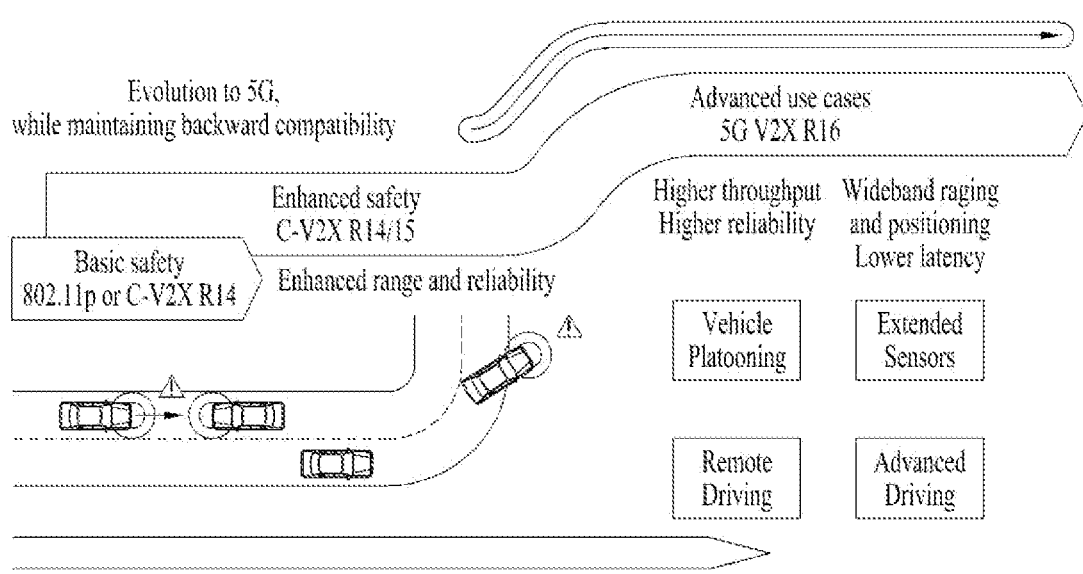
FIG. 1 is a diagram for explaining by comparing V2X communication based on RAT before NR and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
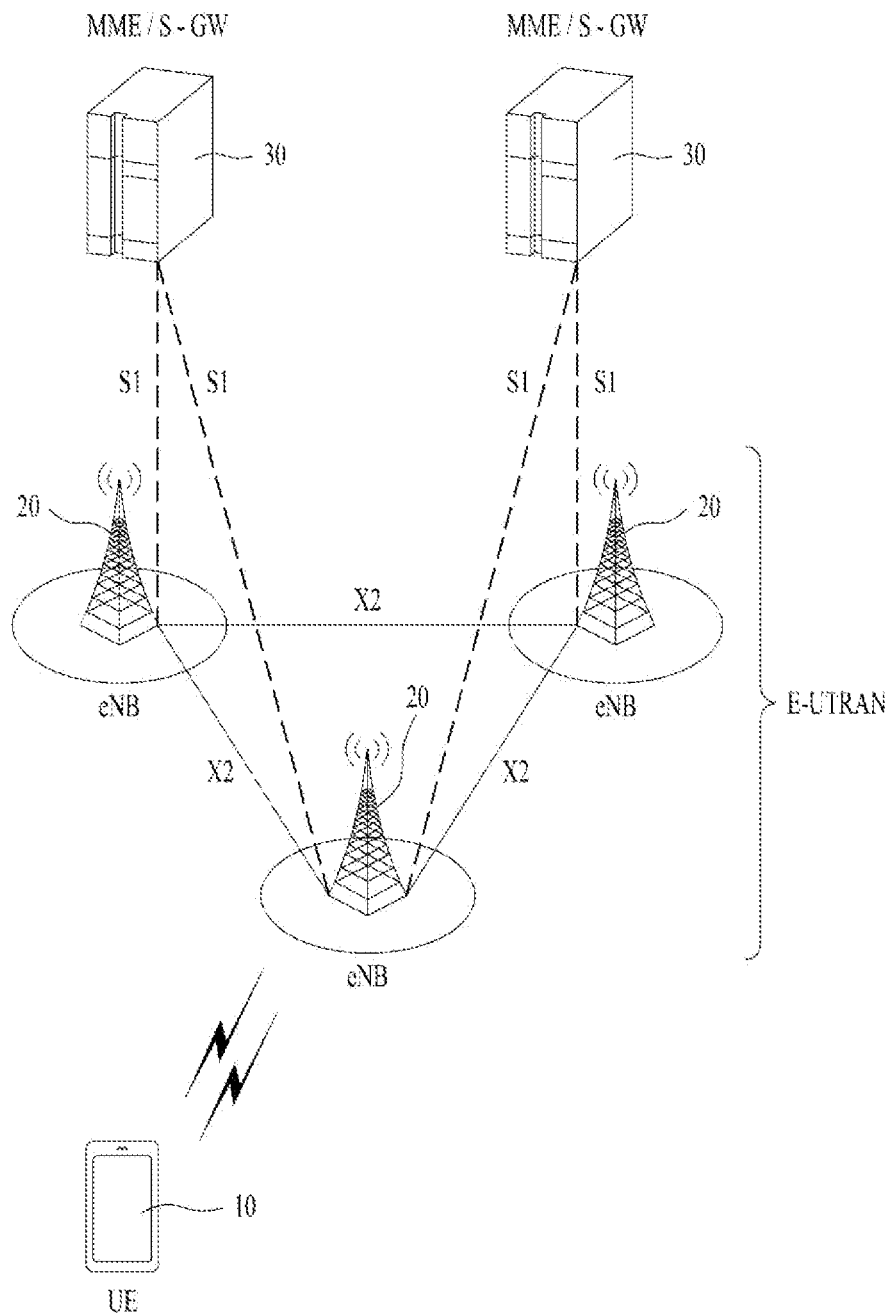
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
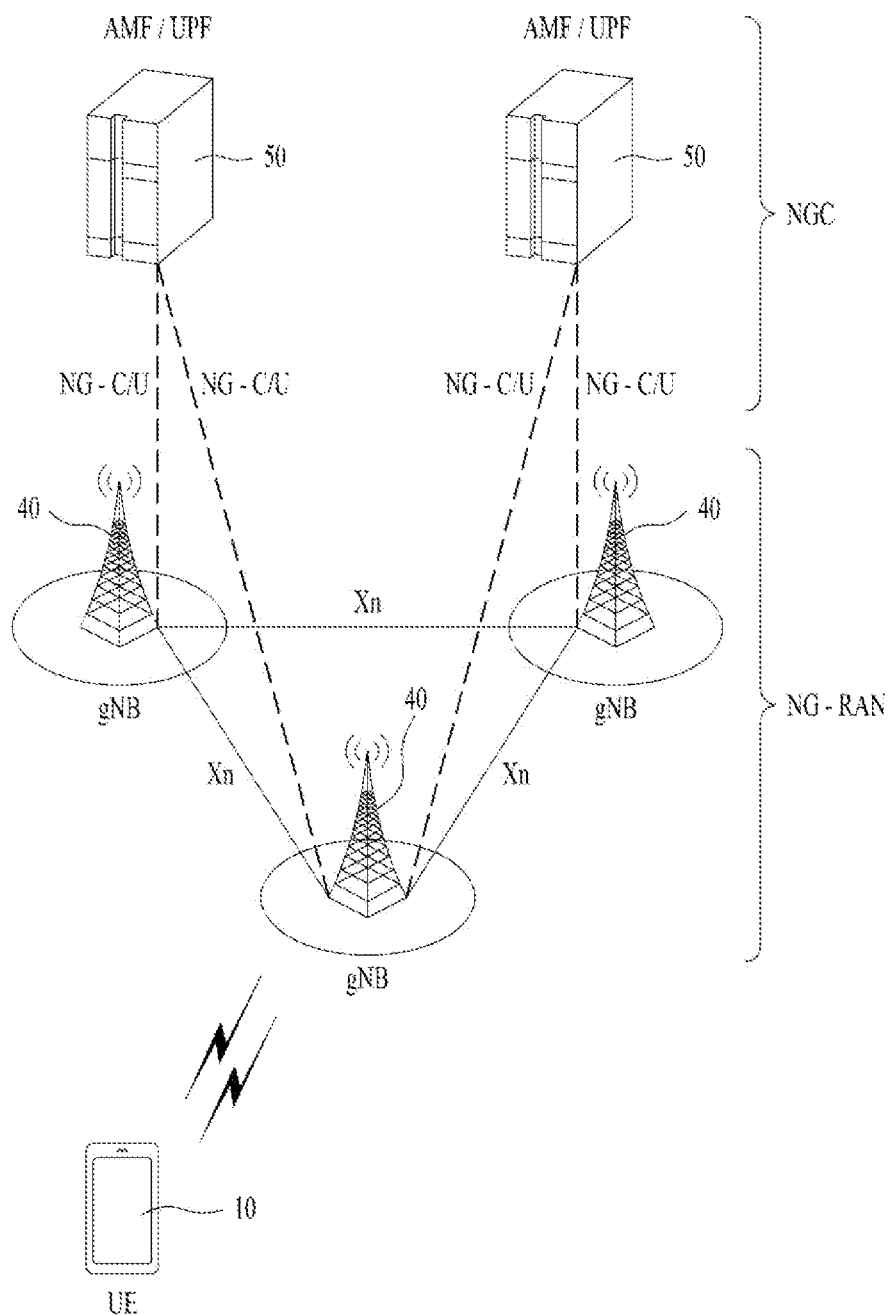
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
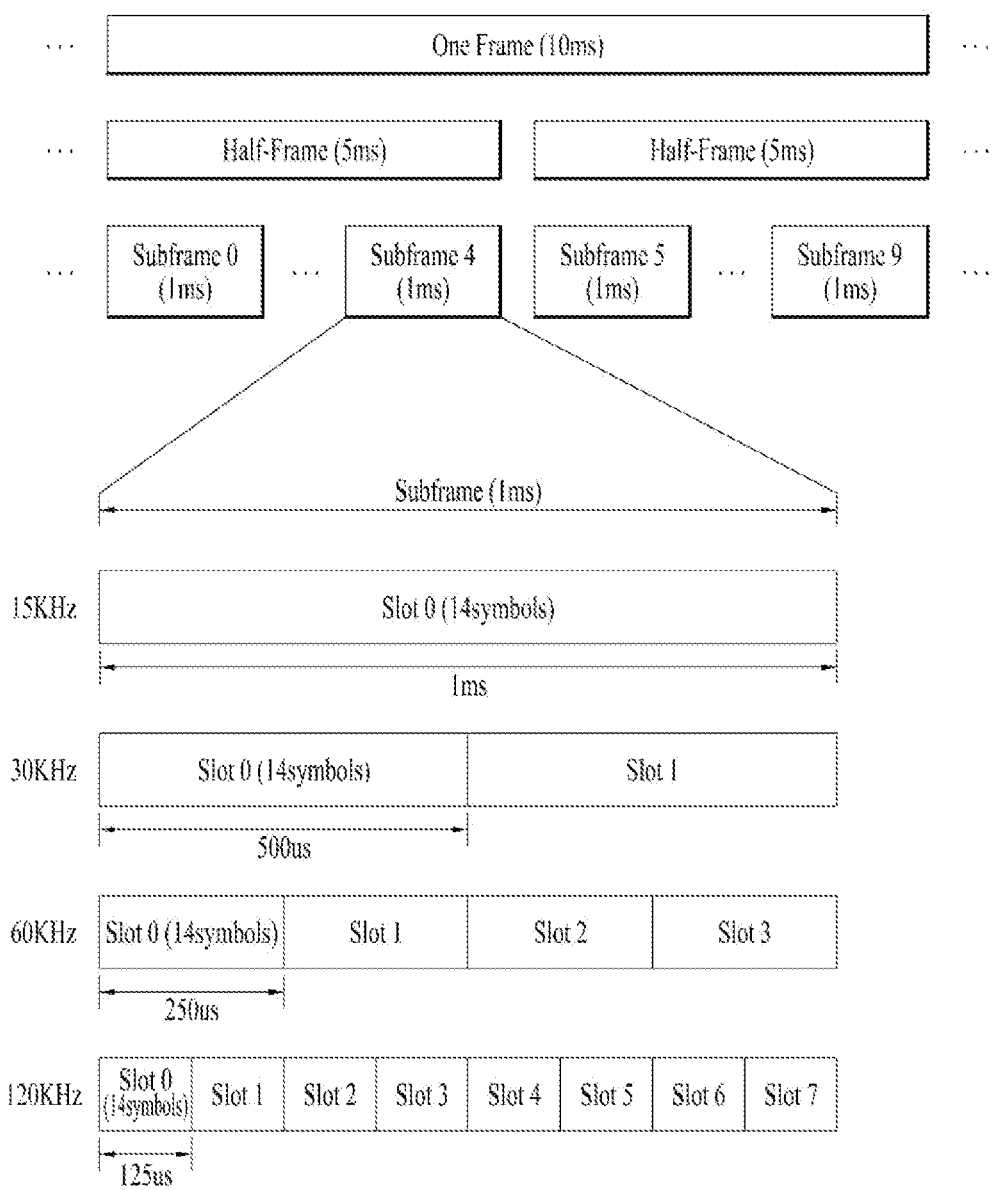
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
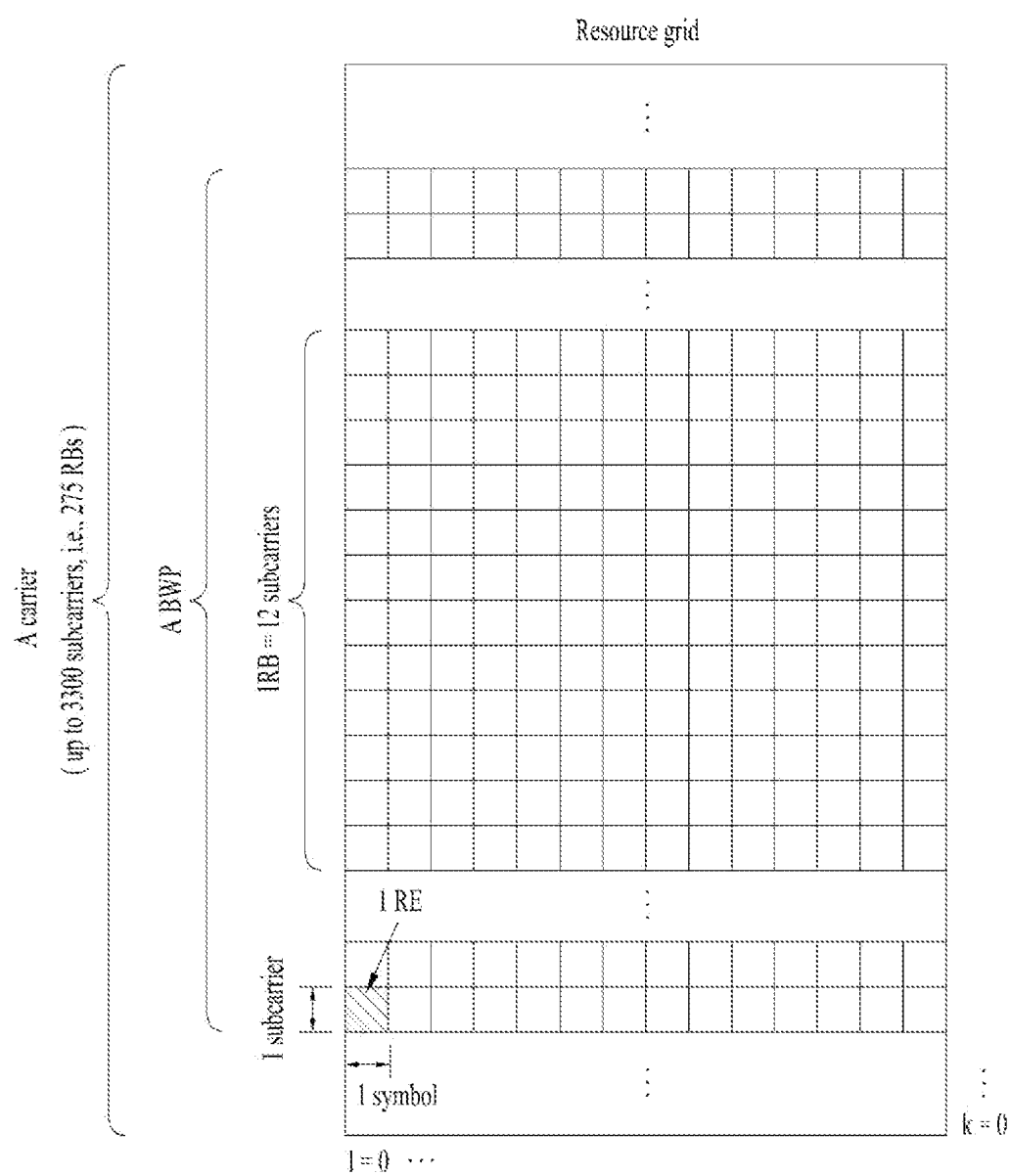
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/ PSBCH block, hereinafter sidelink-synchronization signal block (S-SSB)) supporting periodic transmission. The S-SSB may have the same numerology (i.e., SCS and CP length) as a physical sidelink control channel (PSCCH)/ physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
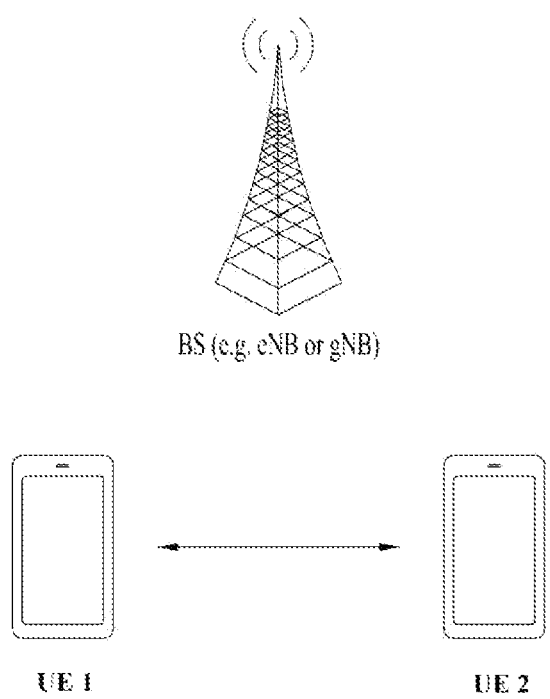
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
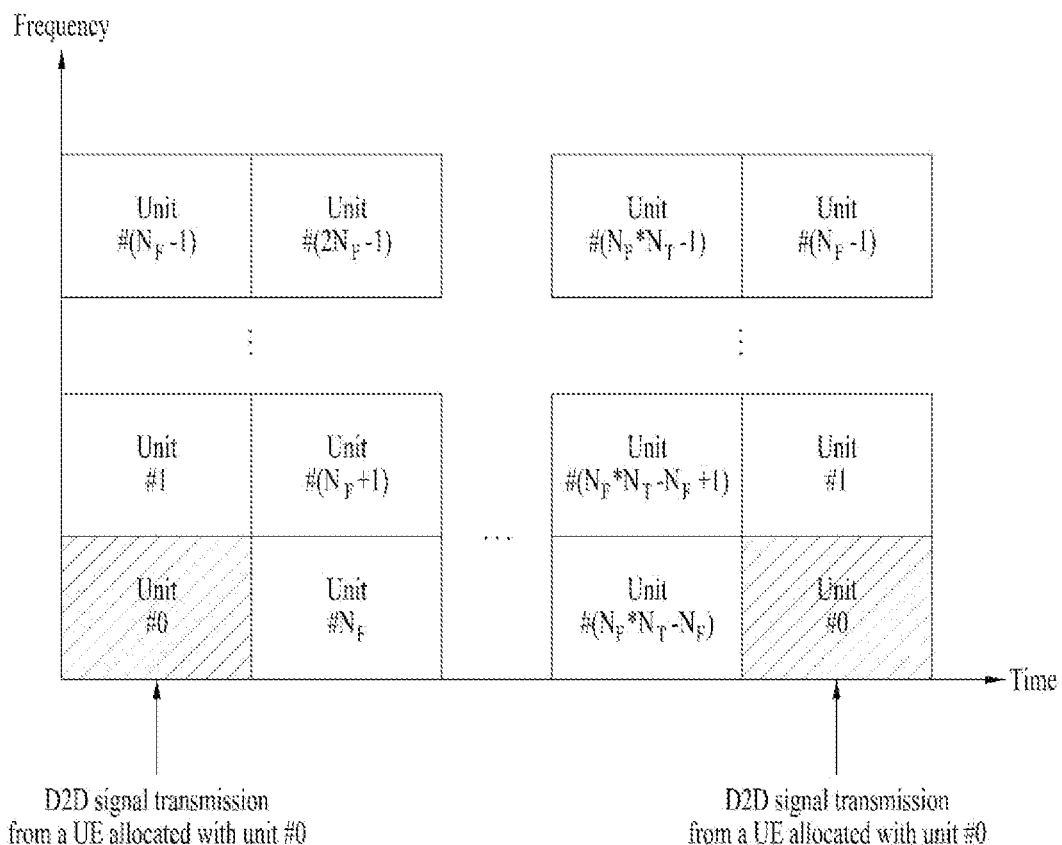
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

The hybrid automatic repeat request (HARQ) scheme may be configured by combining the FEC and the ARQ, may check whether data received by a physical layer contains error that is not capable of being decoded, and may request retransmission when error occurs to improve performance.

In the case of sidelink (SL) unicast and group cast, HARQ feedback and HARQ combining at a physical layer may be supported. For example, when a reception (RX) UE operates in a resource allocation mode 1 or 2, the RX UE may receive a PSSCH from the TX UE, and the RX UE may transmit HARQ feedback to the PSSCH to the TX UE using a sidelink feedback control information (SFCI) format through a physical sidelink feedback channel (PSFCH).

When the SL HARQ feedback is enabled for unicast, if the RX UE successfully decodes the corresponding transport block in the case of a non-Code Block Group (non-CBG) operation, the RX UE may generate HARQ-ACK. The RX UE may transmit HARQ-ACK to a transmission (TX) UE. After the RX UE decodes an associated PSCCH with the RX UE as a target, if the RX UE does not successfully decode the corresponding transport block, the RX UE may generate HARQ-NACK. The RX UE may transmit HARQ-NACK to the TX UE.

When sidelink HARQ feedback is enabled for groupcast, the UE may determine whether to transmit HARQ feedback based on a TX/RX distance and/or RSRP. For a non-CBG operation, two options may be supported.

(1) Option 1: After the RX UE decodes an associated PSCCH, if the RX UE fails to decode the corresponding transport block, the RX UE may transmit a HARQ-NACK on the PSFCH. Otherwise, the RX UE may not transmit a signal on the PSFCH.

(2) Option 2: If the RX UE successfully decodes the corresponding transport block, the RX UE may transmit a HARQ-ACK on the PSFCH. After the RX UE decodes the associated PSCCH targeting the RX UE, if the RX UE does not successfully decode the corresponding transport block, the RX UE may transmit a HARQ-NACK on the PSFCH.

In the case of mode 1 resource allocation, a time between HARQ feedback transmission on the PSFCH and the PSSCH may be (pre)configured. In the case of unicast and groupcast, if retransmission is required on the sidelink, this may be indicated to the BS by the UE within coverage using the PUCCH. The TX UE may transmit an indication to a serving BS of the TX UE in the form such as a Scheduling Request (SR)/Buffer Status Report (BSR) instead of the form of a HARQ ACK/NACK. Even if the BS does not receive the indication, the BS may schedule a sidelink retransmission resource to the UE.

In the case of mode 2 resource allocation, a time between HARQ feedback transmission on the PSFCH and the PSSCH may be (pre)configured.

SL congestion control will be described below.

When the UE autonomously determines SL transmission resources, the UE also autonomously determines the size and frequency of the resources used by itself. Obviously, due to constraints from the network, the use of resource sizes or frequencies above a certain level may be limited. However, in a situation in which a large number of UEs are concentrated in a specific region at a specific time point, when all the UEs use relatively large resources, overall performance may be greatly degraded due to interference.

Therefore, the UE needs to observe a channel condition. When the UE determines that excessive resources are being consumed, it is desirable for the UE to take an action of reducing its own resource use. In this specification, this may be referred to as congestion control. For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Wireless Communication System for Supporting Unlicensed Band

FIG. 10 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

FIG. 10(a) shows a case in which the UE and BS exchange signals on both the LCC and UCC (non-standalone (NSA) mode). In this case, the LCC and UCC may be set to the PCC and SCC, respectively. As shown in FIG. 10(b), the terminal and the base station may transmit and receive signals through one UCC or a plurality of carrier-coupled UCCs. That is, the terminal and the base station can transmit and receive signals through only UCC(s) without LCC. For standalone operation, PRACH, PUCCH, PUSCH, SRS transmission, etc. may be supported in UCell.

The signal transmission/reception operation in an unlicensed band described in the present disclosure may be performed based on the above-described deployment scenario (unless otherwise stated). Also, the definitions below may be applied to terms used herein.

Channel: May be composed of consecutive RBs in which a channel access procedure is performed in a shared spectrum, and may refer to a carrier or a part of a carrier.

Channel Access Procedure (CAP): Represents a procedure for evaluating channel availability based on sensing in order to determine, before signal transmission, whether other communication node(s) use a channel A basic unit for sensing is a sensing slot of duration $T_{sl}$=9 us. If a BS or a UE senses a channel for the sensing slot duration, and the power detected for at least 4 us within the sensing slot duration is less than an energy detection threshold)(Thresh, the sensing slot duration $T_{sl}$ is considered an idle state. Otherwise, the sensing slot duration $T_{sl}$=9 us is considered a busy state. The CAP may be referred to as Listen-Before-Talk (LBT).

Channel occupancy: Means the corresponding transmission(s) by the BS/UE on the channel(s) after the CAP is performed.

Channel Occupancy Time (COT): Refers to the total time for which the BS/UE and any BS/UE(s) sharing the channel occupancy may perform transmission(s) on the channel after the BS/UE performs the CAP. In determining the COT, when the transmission gap is 25 us or less, the gap period is also counted in the COT. The COT may be shared for transmission between the BS and the corresponding UE(s).

DL transmission burst: Defined as a set of transmissions from the BS, with no gap exceeding 16 us. Transmissions from the BS, separated by a gap exceeding 16 us, are considered DL transmission bursts separate from each other. In the DL transmission burst, the BS may perform the transmission(s) after the gap without sensing channel availability.

UL transmission burst: Defined as a set of transmissions from the UE, with no gap exceeding 16 us. Transmissions from the UE, separated by a gap exceeding 16 us, are considered UL transmission bursts separate from each other. In the UL transmission burst, the UE may perform transmission(s) after the gap without sensing channel availability.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 11:
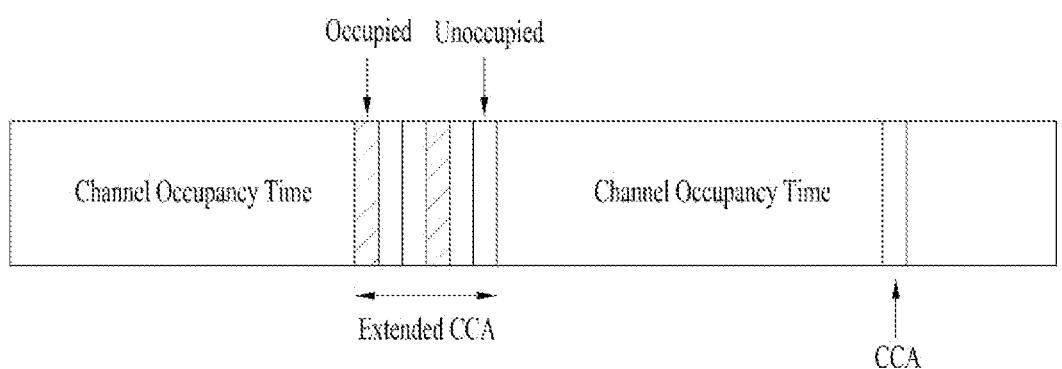
FIG. 11 illustrates a resource occupancy method in a U-band.

FIG. 11 illustrates a resource occupancy method in a U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.11ac) specifies a CCA threshold of −62 dBm for non-Wi-Fi signals and a CCA threshold of −82 dBm for Wi-Fi signals. When it is determined that the channel is idle, the communication node may start the signal transmission in a UCell. The sires of processes described above may be referred to as Listen-Before-Talk (LBT) or a channel access procedure (CAP). The LBT, CAP, and CCA may be interchangeably used in this document.

Specifically, for DL reception/UL transmission in a U-band, at least one of the following CAP methods to be described below may be employed in a wireless communication system according to the present disclosure.

DL Signal Transmission Method in U-Band

The BS may perform one of the following U-band access procedures (e.g., CAPs) for DL signal transmission in a U-band (1) Type 1 DL CAP Method In the Type 1 DL CAP, the length of a time duration spanned by sensing slots sensed to be idle before transmission(s) may be random. The Type 1 DL CAP may be applied to the following transmissions:

Transmission(s) initiated by the BS including (i) a unicast PDSCH with user plane data or (ii) a unicast PDCCH scheduling user plane data in addition to the unicast PDSCH with user plane data, or Transmission(s) initiated by the BS including (i) a discovery burst only or (ii) a discovery burst multiplexed with non-unicast information.

Figure 12:
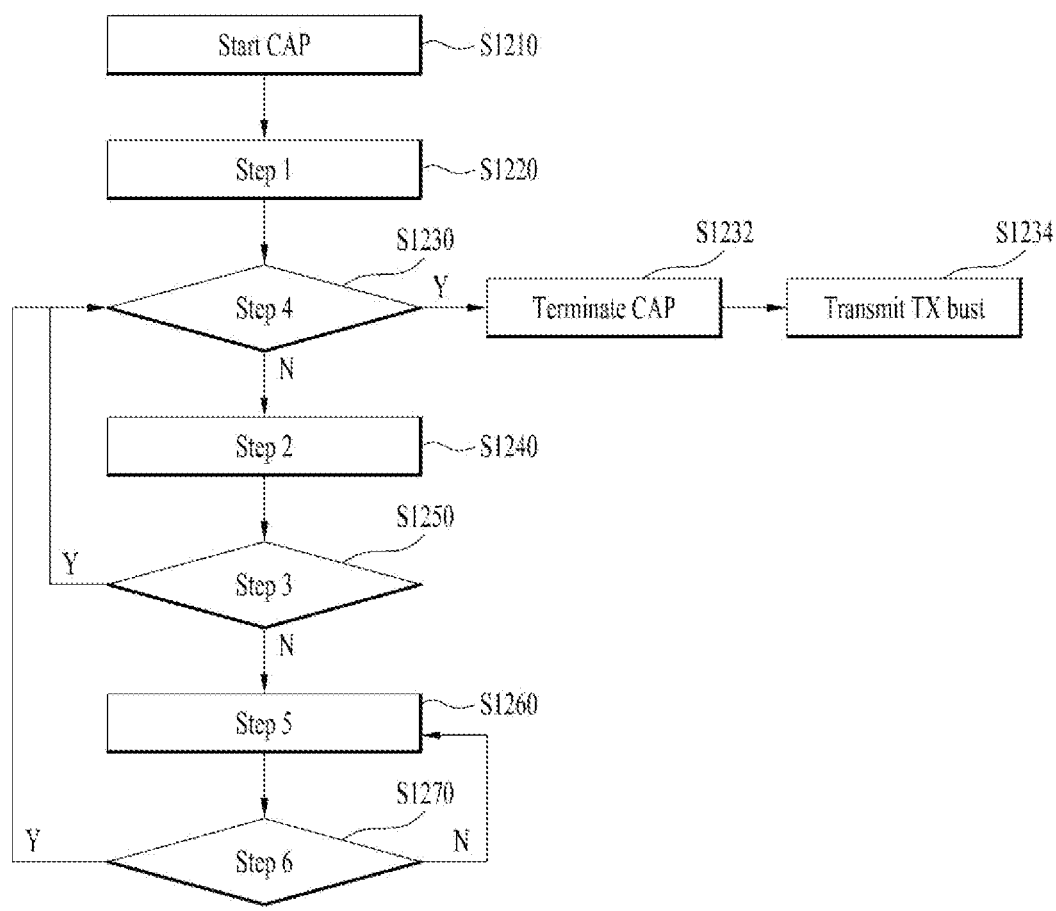
FIGS. 12 and 13 are flowcharts of a channel access procedure (CAP) for transmitting a signal through an unlicensed band.

FIG. 12 is a flowchart of a CAP operation for transmitting a downlink signal through an unlicensed band of a BS.

Referring to FIG. 12, the BS first senses whether a channel is in an idle state for a sensing slot duration of a defer duration Td, and may then perform transmission when the counter N reaches 0 (S1234). Here, the counter N is adjusted by sensing the channel for additional sensing slot duration(s) according to the procedure below Step 1) (S1220) The BS sets N to $N_{init}$ (N=$N_{init}$), where $N_{init}$ is a random number uniformly distributed between 0 and $CW_p$. Then, step 4 proceeds.

Step 2) (S1240) If N>0 and the BS determines to decrease the counter, the BS sets N to N−1 (N=N−1).

Step 3) (S1250) The BS senses the channel for the additional sensing slot duration. If the additional sensing slot duration is idle (Y), step 4 proceeds. Otherwise (N), step 5 proceeds.

Step 4) (S1230) If N=0 (Y), the BS terminates the CAP (S1232). Otherwise (N), step 2 proceeds.

Step 5) (S1260) The BS senses the channel until either a busy sensing slot is detected within an additional defer duration Td or all the slots of the additional defer duration Td are detected to be idle.

Step 6) (S1270) If the channel is sensed to be idle for all the slot durations of the additional defer duration $T_d$ (Y), step 4 proceeds. Otherwise (N), step 5 proceeds.

Table 5 shows that mp, a minimum contention window (CW), a maximum CW, a maximum channel occupancy time (MCOT), and an allowed CW size, which are applied to the CAP, vary depending on channel access priority classes.

TABLE 5

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration Td is composed of a duration of mp consecutive sensing slot Tsl (9 us)+duration Tf (16 us). Tf includes the sensing slot duration Tsl at the start of the 16 us duration.

The following relationship is satisfied: $CW_{min,p} <= CW_p <= CW_{max,p}$. $CW_p$ may be initially configured by $CW_p = CW_{min,p}$ and updated before step 1 based on HARQ-ACK feedback (e.g., ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next highest allowed value or maintained as it is.

(2) Type 2 DL CAP Method

In the Type 2 DL CAP, the length of a time duration spanned by sensing slots sensed to be idle before transmission(s) may be determined. The Type 2 DL CAP is classified into Type 2A/2B/2C DL CAPs.

The Type 2A DL CAP may be applied to the following transmissions. In the Type 2A DL CAP, the BS may perform transmission immediately after the channel is sensed to be idle at least for a sensing duration $T_{short\_dl}=25$ us. Here, $T_{short\_dl}$ includes the duration $T_f$ (=16 us) and one sensing slot duration immediately after the duration $T_f$, where the duration $T_f$ includes a sensing slot at the beginning thereof.

Transmission(s) initiated by the BS including (i) a discovery burst only or (ii) a discovery burst multiplexed with non-unicast information, or Transmission(s) by the BS after a gap of 25 us from transmission(s) by the UE within a shared channel occupancy.

The Type 2B DL CAP is applicable to transmission(s) performed by the BS after a gap of 16 us from transmission(s) by the UE within a shared channel occupancy time. In the Type 2B DL CAP, the BS may perform transmission immediately after the channel is sensed to be idle for Tf=16 us. Tf includes a sensing slot within 9 us from the end of the duration. The Type 2C DL CAP is applicable to transmission(s) performed by the BS after a maximum of 16 us from transmission(s) by the UE within the shared channel occupancy time. In the Type 2C DL CAP, the BS does not perform channel sensing before performing transmission.

UL Signal Transmission Method in U-Band

The UE may perform a Type 1 or Type 2 CAP for UL signal transmission in a U-band. In general, the UE may perform the CAP (e.g., Type 1 or Type 2) configured by the BS for UL signal transmission. For example, a UL grant scheduling PUSCH transmission (e.g., DCI formats 0_0 and 0_1) may include CAP type indication information for the UE.

(1) Type 1 UL CAP Method

In the Type 1 UL CAP, the length of a time duration spanned by sensing slots sensed to be idle before transmission(s) is random. The Type 1 UL CAP may be applied to the following transmissions.

PUSCH/SRS transmission(s) scheduled and/or configured by the BS

PUCCH transmission(s) scheduled and/or configured by the BS

Transmission(s) related to a Random Access Procedure (RAP)

Figure 13:
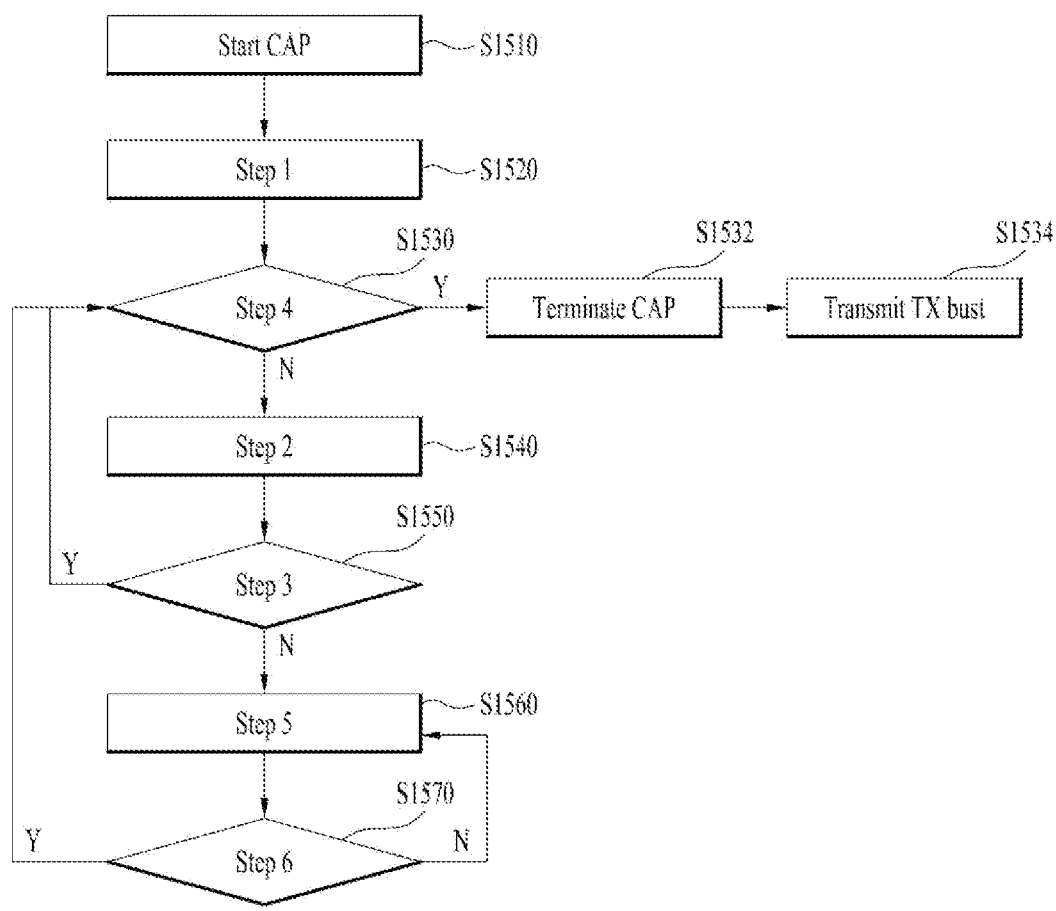

FIG. 13 is a flowchart illustrating CAP operations performed by a UE to transmit a UL signal.

Referring to FIG. 13, the UE may sense whether a channel is idle for sensing slot durations of a defer duration $T_d$. Then, if a counter N is zero, the UE may perform transmission (S1534). In this case, the UE may adjust the counter N by sensing the channel for additional sensing slot duration(s) according to the following steps:

Step 1) (S1520) The UE sets N to $N_{init}$ (N=$N_{init}$), where $N_{init}$ is a random number uniformly distributed between 0 and $CW_p$. Then, step 4 proceeds.

Step 2) (S1540) If N>0 and the UE determines to decrease the counter, the UE sets N to N−1 (N=N−1).

Step 3) (S1550) The UE senses the channel for the additional sensing slot duration. If the additional sensing slot duration is idle (Y), step 4 proceeds. Otherwise (N), step 5 proceeds.

Step 4) (S1530) If N=0 (Y), the UE terminates the CAP (S1532). Otherwise (N), step 2 proceeds.

Step 5) (S1560) The UE senses the channel until either a busy sensing slot is detected within an additional defer duration Ta or all the slots of the additional defer duration Td are detected to be idle.

Step 6) (S1570) If the channel is sensed to be idle for all the slot durations of the additional defer duration $T_d$ (Y), step 4 proceeds. Otherwise (N), step 5 proceeds.

Table 6 shows that mp, a minimum CW, a maximum CW, an MCOT, and an allowed CW size, which are applied to the CAP, vary depending on channel access priority classes.

TABLE 6

| Channel Access Priority Class | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63} |
| 4 | 7 | 15 | 1023 | 6 or 10 ms | {15, 31, 63, 127, 255, 511, 1023} |

The defer duration $T_d$ is configured in the following order: duration $T_f$ (16 us)+mp consecutive sensing slot durations $T_{sl}$ (9 us). $T_f$ includes the sensing slot duration $T_{sl}$ at the beginning of the 16-us duration.

The following relationship is satisfied: $CW_{min,p} <= CW_p <= CW_{max,p}$. $CW_p$ may be initially configured by $CW_p = CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next highest allowed value or maintained as it is.

(2) Type 2 UL CAP Method

In the Type 2 UL CAP, the length of a time duration spanned by sensing slots sensed to be idle before transmission(s) may be determined. The Type 2 UL CAP is classified into Type 2A/2B/2C UL CAPs. In the Type 2A UL CAP, the UE may perform transmission immediately after the channel is sensed to be idle at least for a sensing duration Tshort_dl=25 us. Here, Tshort_dl includes the duration Tf (=16 us) and one sensing slot duration immediately after the duration Tf. In the Type 2A UL CAP, Tf includes a sensing slot at the beginning thereof. In the Type 2B UL CAP, the UE may perform transmission immediately after the channel is sensed to be idle for the sensing duration Tf=16 us. In the Type 2B UL CAP, Tf includes a sensing slot within 9 us from the end of the duration. In the Type 2C UL CAP, the UE does not perform channel sensing before performing transmission.

RB Interlace

Figure 14:
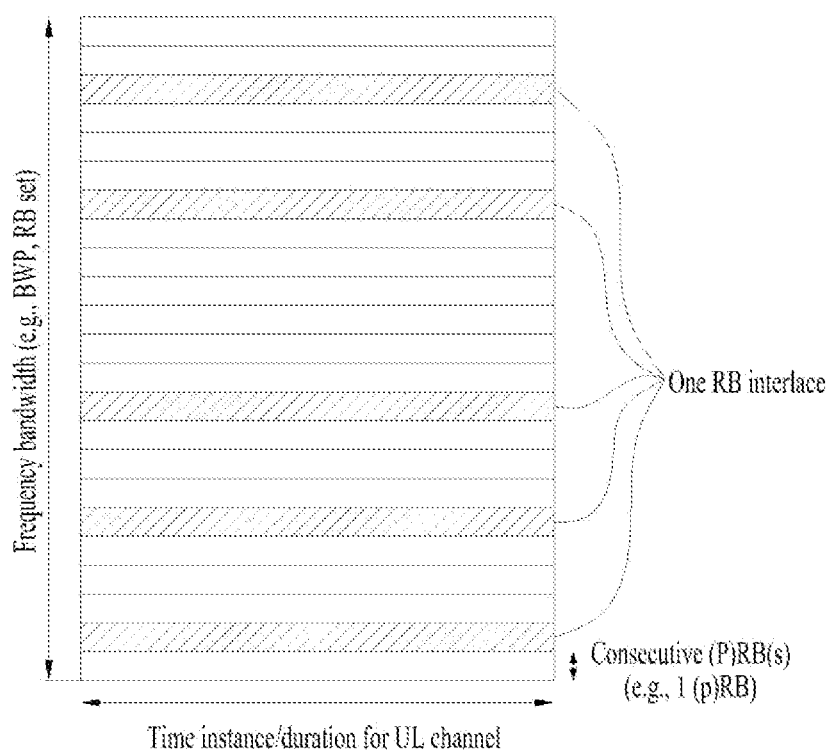
FIG. 14 illustrates an RB interlace.

FIG. 14 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 14, a plurality of RB interlaces (interlaces) may be defined in a frequency bandwidth. Here, the frequency bandwidth may include a (wideband) cell/CC/BWP/RB set, and the RB may include a PRB. For example, interlace #m∈{0, 1, ..., M−1} may consist of (common) RBs {m, M+m, 2M+m, 3M+m, ...}, where M represents the number of interlaces. A transmitter (e.g., UE) may use one or more interlaces to transmit a signal/channel. The signal/channel may include a PUCCH or PUSCH.

3. PUCCH Transmission in U-Band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

In addition, PRACH preamble design methods to be described later may be related to UL transmission, and thus, the methods may be equally applied to the above-described UL signal transmission methods in U-band systems. To implement the technical idea of the present disclosure in the corresponding systems, the terms, expressions, and structures in this document may be modified to be suitable for the systems.

For example, UL transmission based on the following PUCCH transmission methods may be performed on an L-cell and/or U-cell defined in the U-band systems.

As described above, the Wi-Fi standard (802.11ac) specifies a CCA threshold of −62 dBm for non-Wi-Fi signals and a CCA threshold of −82 dBm for Wi-Fi signals. In other words, a station (STA) or access point (AP) of the Wi-Fi system may transmit no signal in a specific band if the STA or AP receives a signal from a device not included in the Wi-Fi system in the specific band at a power of −62 dBm or higher.

In this document, the term 'U-band' may be interchangeably used with the term 'shared spectrum'.

In the conventional NR system, five PUCCH formats are configured from PUCCH format 0 to PUCCH format 4 as shown in Table 4 above. PUCCH formats 0, 1, and 4 are configured to occupy a single PRB, and PUCCH formats 2 and 3 are configured to occupy 1 to 16 PRBs over OFDM symbols.

Hereinafter, PUCCH formats used in a shared spectrum will be described. When a specific device (and/or node) transmits a signal in the shared spectrum, there may be PSD restrictions. For example, according to the European Telecommunications Standards Institute (ETSI) regulation, signal transmission in a specific band needs to satisfy a PSD of 10 dBm/1 MHz. When the SCS is 15 kHz, if a PUCCH is transmitted with PUCCH format 0 (one PRB and 180 kHz), the maximum allowable power for the PUCCH may be about 10 dBm. In general, the maximum power of the UE is 23 dBm, and the maximum allowable power of 10 dBm is significantly lower than 23 dBm. If the UE transmits a UL signal at 10 dBm, the maximum UL coverage supported by the UE may be reduced. If the UE transmits a PUCCH in a wide frequency domain (F-domain) to increase the transmit power, it may help to solve the problem that the UL coverage is reduced. As regulations in the shared spectrum, there may be OCB restrictions. For example, when a specific device transmits a signal, the signal may need to occupy at least 80% of the system bandwidth. If the system bandwidth is 20 MHz, the signal transmitted by the specific device may need to occupy more than 16 MHz, which is 80% of 20 MHz.

As a PUCCH structure in consideration of the PSD and OCB regulations, the above-described RB interlace structure may be used. For example, if a PUCCH sequence of the conventional PUCCH configured to use one PRB as in PUCCH format 0 and/or 1 is repeated over PRBs spaced at specific intervals in the frequency domain in consideration of the OCB, a PUCCH may be configured. If the PUCCH is transmitted in an RB interlace, the same PUCCH sequence may be repeatedly transmitted. The repeated transmission may increase a peak to average power ratio (PAPR) value and a cube metric (CM) value. However, the lower the PAPR and CM values, the better the transmission performance. Accordingly, methods of selecting a cyclic shift (CS) value and/or a phase shift (PS) value of a PUCCH sequence for each repetition in consideration of the PAPR and CM when a PUCCH is transmitted in an RB interlace in the frequency domain will be proposed.

The methods proposed in the present disclosure may be applied to other use cases as well as the NR U-band. For example, the methods proposed in the present disclosure may be used for an NR-based non-terrestrial network (NTN).

Hereinafter, a method of allocating a frequency resource for NR sidelink in an unlicensed band will be described in detail.

NR Sidelink Frequency Resource Allocation in Unlicensed Band

Figure 15:
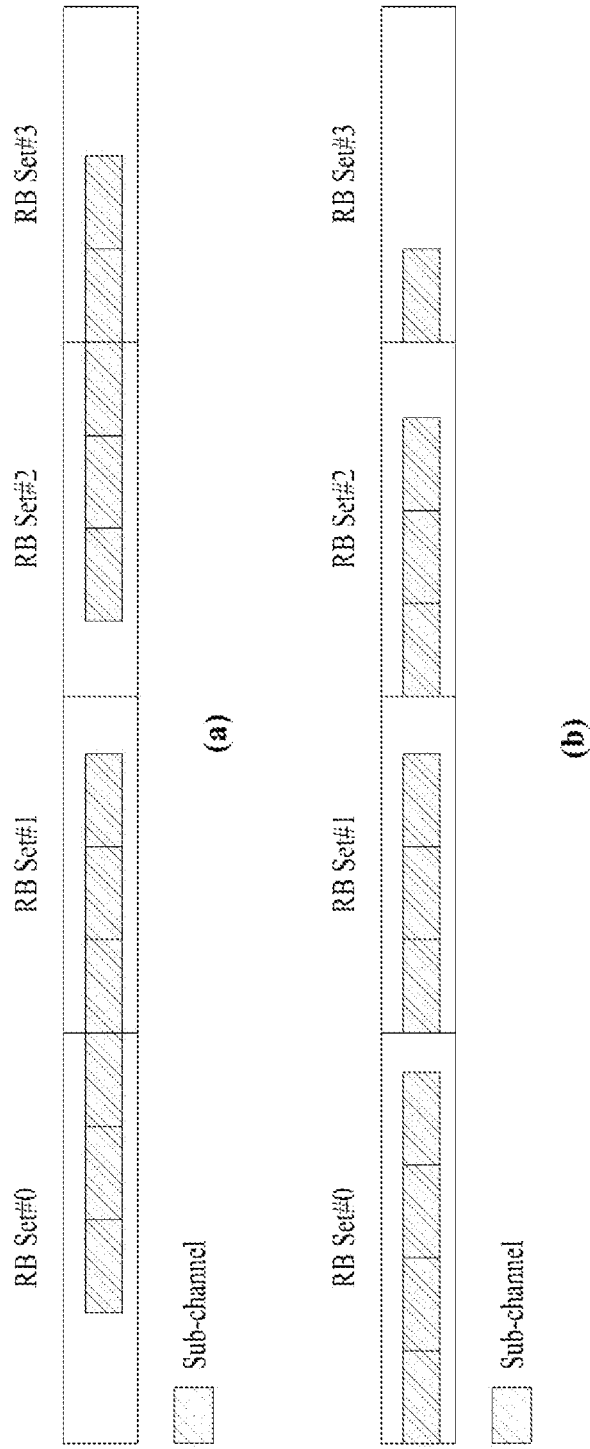
FIGS. 15 and 16 are diagrams for explaining an NR sidelink frequency resource allocation method in an unlicensed band.
Figure 16:
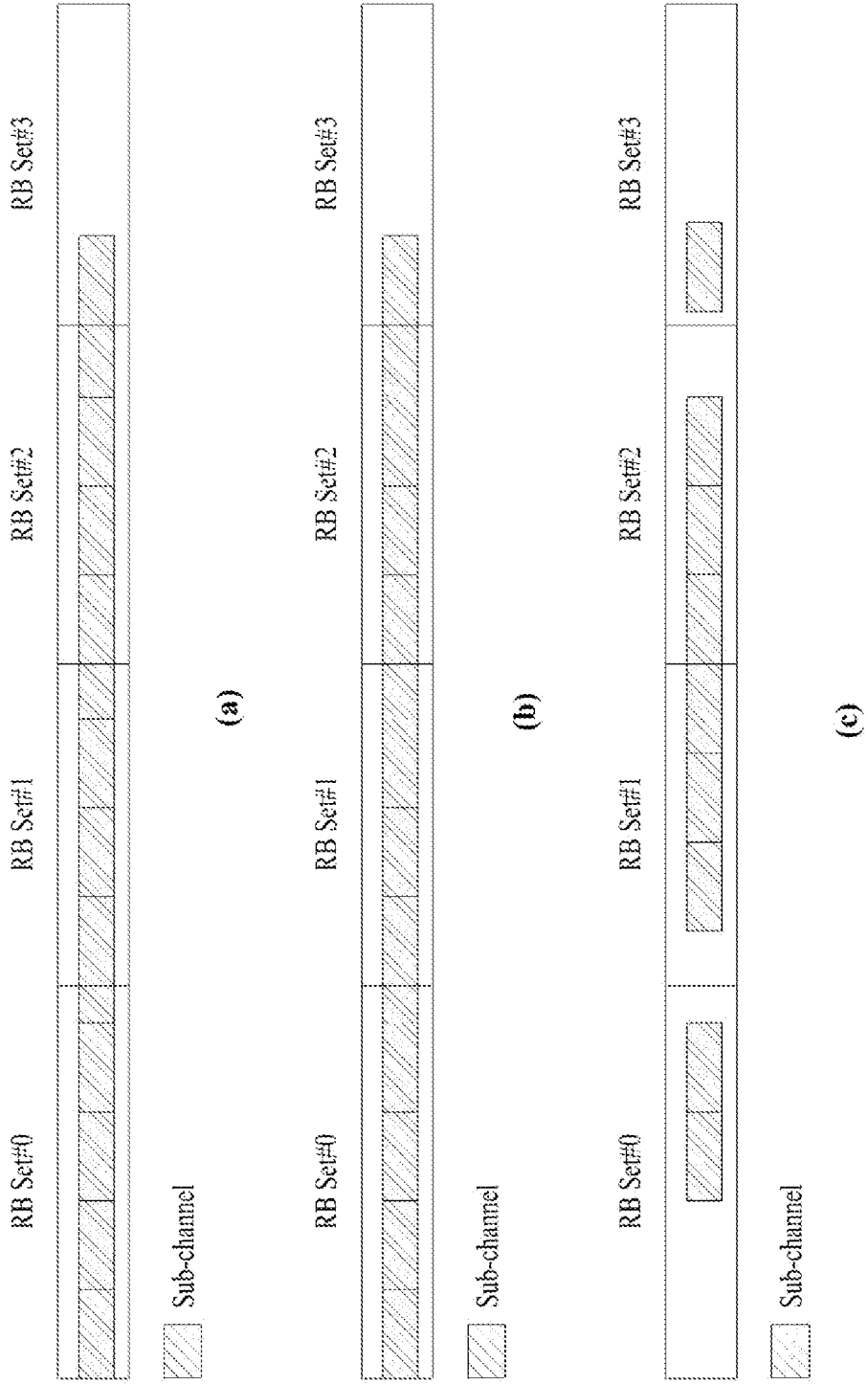

FIGS. 15 and 16 are diagrams for explaining an NR sidelink frequency resource allocation method in an unlicensed band.

The UE may perform transmission and/or reception of a sidelink signal in an unlicensed band. Transmission and/or reception of a sidelink signal in an unlicensed band may be preceded by a channel sensing operation (e.g., energy detection/measurement) for a channel to be used according to band-specific regulations and/or requirements. When the UE determines that the channel or resource block set to be used is IDLE (or idle state) based on the result of the channel sensing (e.g., when the measured energy is below or less than a specific threshold), the UE may perform transmission and/or reception of a sidelink signal in the unlicensed band. As such, when the channel or resource block set (RB set) to be used is determined to be BUSY based on the result of channel sensing (e.g., when the measured energy is above or more than a specific threshold), the UE may cancel all or part of transmission for the unlicensed band. Resource block sets for the unlicensed band may be defined in correspondence with an RB interlace as described above.

Alternatively, in the operation in the unlicensed band, the channel sensing operation may be omitted or simplified (the channel sensing period is relatively small) within a predetermined time after transmission for a specific time period of the UE. In contrast, when a predetermined time elapses after transmission of the sidelink signal, the above-described general channel sensing operation needs to be performed, and after a general channel sensing operation is performed, whether to transmit the sidelink signal in the unlicensed band may be determined.

Alternatively, in transmission in the unlicensed band, each of the size and/or power spectral density (PSD) of a time interval and/or frequency occupied region of a signal/channel transmitted by the UE needs to be equal to or greater than a predetermined level according to regulations or requirements. In other words, in transmission of the sidelink signal in the unlicensed band, the size and/or power size (or power spectral density (PSD)) of a time/frequency resource for the sidelink signal may be regulated according to regulations or requirements. For example, the UE may transmit a sidelink signal in the unlicensed band with the size and/or power spectral density (PSD) of a time interval and/or frequency occupied region of a signal/channel equal to or greater than a predetermined level.

Alternatively, in the unlicensed band, the UE may inform about occupancy for a predetermined time for a channel ensured through initial general channel sensing via channel occupancy time (COT) interval information, thereby simplifying channel sensing. Here, the maximum value of the length of the COT interval may be configured differently according to a priority value of a service or data packet.

In the unlicensed band, the number of resource blocks configuring a resource block set, which is a unit in which channel sensing is performed, and the location of the resource block may be different from the number of resource blocks configuring a sub-channel, which is a unit in which sidelink communication is performed, and the location of the resource block. In this case, a boundary for the resource block set and a boundary for the sub-channel may not be aligned with each other. Furthermore, depending on a carrier, a guard interval may exist between different resource block sets, a resource pool for sidelink communication may include continuous frequency resources, and PSCCH/PSSCH communication may also be considered to use a guard region during transmission in a specific situation when being considered to be transmitted through the continuous frequency resources. For example, when the PSCCH/PSSCH, which is a sidelink signal, may need to be transmitted in a continuous frequency resource region, the UE may also be permitted to perform transmission of the sidelink signal even in the guard band (between resource block sets configured for a carrier related to an unlicensed band or a guard region). That is, when transmission of the PSCCH and/or the PSSCH is required in the continuous frequency resource region, the UE may transmit the PSCCH and/or the PSSCH in the continuous frequency resource region using the guard band to be configured between resource block sets in the unlicensed band.

FIG. 15(a) shows a method of aligning a boundary between sub-channels related to sidelink and a boundary between resource block sets related to an unlicensed band. When the number of resource block sets is two or more in the alignment method, it may be difficult to align the boundary of the sub-channels with the boundary of the resource block sets. To solve this, a frequency gap may be allowed in a portion between sub-channels configuring a resource pool. For example, when the resource pool includes a plurality of sub-channel groups, each of the plurality of sub-channel groups may include continuous sub-channels, and a start frequency offset may be independently (pre) configured. Alternatively, the frequency offset between the sub-channel groups may be (pre)configured.

For example, the sub-channel configuring the resource pool for each resource block set may be assigned from a location shifted by an offset (pre)configured from a first resource block/subcarrier of the resource block set or the point. Alternatively, for each resource block set, the remaining RB sets between sub-channels belonging to the same resource pool in the resource block set may not be separately allocated. Referring to FIG. 15(b), at least one sub-channel is allocated for each resource block set, and a sub-channel may not be allocated to the remaining resource block (or the remaining resource block set).

When the PSCCH/PSSCH is transmitted over (or through) a plurality of resource block sets, it may be necessary to ensure transmission using continuous frequency resources. For example, when sub-channels separated from each other are allocated for PSCCH/PSSCH transmission and (and/or) the channel sensing result for a resource block set included in each sub-channel is IDLE, the UE may be permitted to transmit the PSCCH and the PSSCH using up to the remaining resource block between sub-channels. Alternatively, when sub-channels separated from each other for PSCCH/PSSCH transmission are allocated and the channel sensing result for some of the resource block sets included in each sub-channel is BUSY, the UE may transmit the PSCCH/PSSCH using only sub-channels belonging to IDLE resource block sets. Alternatively, when sub-channels separated from each other for PSCCH/PSSCH transmission are allocated and the channel sensing result for some of the resource block sets included in each sub-channel is BUSY, the UE may transmit the PSCCH/PSSCH using a sub-channel belonging to an IDLE resource block set and/or the remaining resource block in the resource block set adjacent to the sub-channel.

Alternatively, when transmission of the PSCCH/PSSCH is required in continuous frequency resources, a sub-channel may be allocated for the remaining resource blocks between sub-channels belonging to the same resource pool in the resource block sets. In detail, a sub-channel having a smaller size than a size of a preconfigured sub-channel may be separately allocated to the remaining resource block, or the remaining resource block may be included in a sub-channel (or a first sub-channel of the adjacent resource block set) allocated to a resource block set adjacent to the remaining resource block.

For example, for each resource block set, a sub-channel having a smaller size than a size of a separately preconfigured sub-channel may be allocated for the remaining RB set between sub-channels belonging to the same resource pool in the resource block set. In detail, referring to FIG. 16(a), while the sub-channels are allocated for each resource block set, a separate sub-channel may also be allocated to the remaining RB set. Alternatively, for each resource block set, the remaining resource blocks between sub-channels belonging to the same resource pool in the resource block set may be configured to be included in the last sub-channel of each resource block set. In detail, referring to FIG. 16(b), sub-channels may be allocated for each resource block set, and the remaining resource block may be included in the last sub-channel of the resource block set.

Alternatively, as described above, the sizes of the sub-channels configuring the resource pool may be different due to allocation and use of the sub-channel for the remaining resource block(s). In this case, it may be difficult to ensure the same value between initial transmission and retransmission when a transport block size (TBS) is calculated. In this regard, the TBS may be calculated by assuming that the number of RBs configuring the allocated sub-channel is the same as the (pre)configured value or without consideration of a sub-channel having a size other than the (pre)configured value.

Alternatively, the sub-channel configuring the resource pool may be allocated based on a first resource block (RB) and/or a first subcarrier of a specific resource block set among the resource block sets, or may be allocated based on the first resource block (RB) and/or the first subcarrier and a preconfigured offset. For example, the sub-channel configuring the resource pool may be allocated from a location shifted by the (pre)configured offset from the first RB/subcarrier of the first resource block set of the carrier or the point (or the first RB/subcarrier of the first resource block set). Alternatively, the sub-channel configuring the resource pool may be configured independently regardless of the resource block set.

Here, a sub-channel overlapping a plurality of resource block sets may be excluded from the sub-channel configuring the resource pool. For example, referring to FIG. 16(c), after sub-channels for the resource pool are allocated based on the first resource block (RB) and/or the first subcarrier, the sub-channel overlapping a plurality of resource block sets may be excluded from the sub-channel for the resource pool.

As described above, the excluded sub-channel (i.e., the above-described remaining resource block) may be used exceptionally when continuous PSCCH/PSSCH transmission needs to be ensured. For example, when the UE allocates sub-channels that are separated from each other for PSCCH/PSSCH transmission and/or when the channel sensing result for the resource block set to which each sub-channel belongs is IDLE, the UE may use the remaining resource block between sub-channels in PSCCH and/or PSSCH transmission. For example, the UE may allocate sub-channels separated from each other for PSCCH/PSSCH transmission, but when the channel sensing result is BUSY for some resource block sets, PSCCH/PSSCH transmission may be performed using only a sub-channel belonging to the resource block set of which channel sensing result is IDLE. For example, the UE allocates sub-channels separated from each other for PSCCH/PSSCH transmission, but when the channel sensing result is BUSY for some resource block sets, PSCCH/PSSCH transmission may be performed using the sub-channel belonging to a resource block set of which channel sensing result is IDLE and/or the remaining resource block in the resource block set adjacent to the sub-channel.

Figure 17:
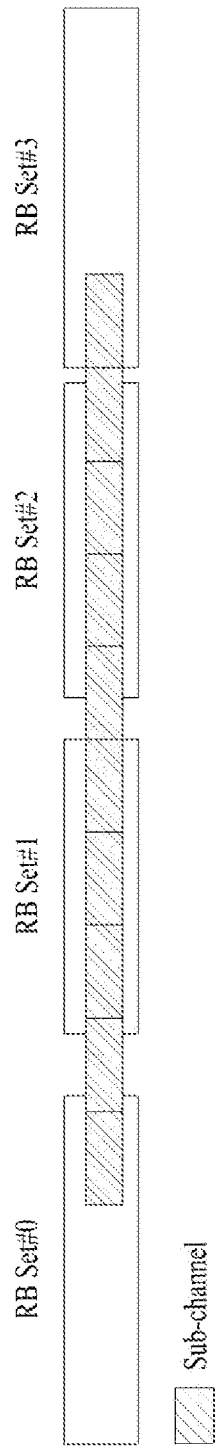
FIG. 17 is a diagram for explaining a method of allocating a sub-channel when a guard band is present between RB sets.

FIG. 17 is a diagram for explaining a method of allocating a sub-channel when a guard band is present between resource block sets.

Referring to FIG. 17, a guard band or a guard region may be configured or present between resource block sets for an unlicensed band.

In detail, the sub-channel configuring the resource pool may be allocated from a first resource block/subcarrier of a first resource block set of a carrier or from a location shifted by a (pre)configured offset from the point (the first RB/subcarrier of the resource block set). Alternatively, the sub-channel configuring the resource pool may be independently configured regardless of the resource block set. A sub-channel overlapping a plurality of resource block sets or a sub-channel overlapping a guard region may be included as a sub-channel configuring a resource pool.

Alternatively, sub-channels of the same size may be successively allocated from a location shifted by a preconfigured offset based on a specific resource block set (or a specific RB) among the plurality of resource block sets. In this case, the sub-channels included in only one resource block set may be allocated to the basic sub-channels shown in FIGS. 15 and 16, and sub-channels across two resource block sets or across a resource block set and a guard band may be allocated as additional sub-channels. Here, the additional sub-channel may be used only when the following specific conditions are satisfied.

In detail, even if the UE allocates an additional sub-channel overlapping a plurality of resource block sets or the guard region for PSCCH/PSSCH transmission, when the channel sensing result for some resource block sets is BUSY, the additional sub-channel may not be used for PSCCH/PSSCH transmission. For example, the UE may allocate an additional sub-channel overlapping a plurality of resource block sets for PSCCH/PSSCH transmission, but when the channel sensing result for some resource block sets is BUSY, resource blocks belonging to the BUSY resource block set among RBs of the additional sub-channel and/or resource blocks belonging to the guard region may not be used for PSCCH/PSSCH transmission.

Alternatively, resource blocks overlapping the guard region may not be configured as the additional sub-channel. Alternatively, the resource blocks overlapping the guard region may be used as a transmission resource of a sidelink signal when the UE determines a resource block set adjacent to the guard region and/or the UE selects/allocates a sub-channel belonging to the adjacent resource block set as a transmission resource. In other words, the additional sub-channel allocated for the guard region may be used for transmission of the sidelink signal only when the adjacent resource block sets of the guard region are determined to be IDLE.

Here, the above-described method of not performing transmission for the additional sub-channel may be a PUNCTURING method or a RATE-MATCHING method.

When a plurality of resource block sets are scheduled, a channel sensing result of some resource block sets may be BUSY, and a channel sensing result of some resource block sets may be IDLE. In this case, DL transmission may be performed only for the resource block set of which channel sensing result is IDLE, and UL transmission may be performed only when the channel sensing result for all resource block sets to which the allocated resource blocks belong is IDLE. In the case of PSCCH/PSSCH transmission in sidelink communication, a PSCCH transmission resource may overlap a PSSCH resource, and second SCI may be transmitted through the PSSCH and may be configured in a form that is repeated in a next symbol after mapping in ascending order from the lowest index of the allocated frequency resource from the first transmitted DMRS symbol.

For example, if the channel sensing result for some resource block sets in the sidelink transmission resource allocated across a plurality of resource block sets is BUSY, the UE may cancel sidelink transmission (e.g., PSCCH/PSSCH) for the entire allocated frequency. This is because it is difficult to use a compensation method for the case in which some CBGs are PUNCTURED according to the channel sensing result since detection performance of first SCI and/or second SCI is not ensured and also code block group (CBG)-based scheduling in sidelink is not supported.

Alternatively, in sidelink transmission resource allocated across a plurality of resource block sets, even if the channel sensing result for some resource block sets is BUSY, when the channel sensing result for the resource block set through which at least the PSCCH is transmitted is IDLE, the UE may perform PSCCH/PSSCH transmission through an assigned sub-channel(s) belonging to a resource block set of which entire or partial channel sensing result is IDLE. For the sidelink transmission resource allocated across a plurality of resource block sets, when the channel sensing result for some resource block sets is BUSY, if the number of resource elements (REs) for the second SCI, the number of encoded bits, an encoding rate, and the like are satisfied, the PSCCH/PSSCH may be transmitted from resource block sets of which channel sensing result is IDLE. For example, when the number of REs for the second SCI belonging to at least IDLE resource block set and/or the number of encoded bits is equal to or greater than a (pre)configured or predefined threshold or an actual encoding rate for the second SCI to be actually transmitted according to the channel sensing result is equal to or greater than a (pre)configured or predefined threshold, the UE may perform PSCCH/PSSCH transmission through allocated sub-channel(s) to which the resource block set of which entire (or partial) channel sensing result is IDLE belongs. In this case, the case in which the sub-channels used for transmission are continuous on a frequency side may be limited.

Alternatively, even if some resource block sets are BUSY according to a channel sensing result in an unlicensed band, a transmission possibility may be increased by changing the PSCCH and/or second SCI mapping method to transmit the PSCCH and/or the second SCI to a plurality of resource block sets (or each of the plurality of resource block sets).

For example, the UE may repeatedly transmit the PSCCH for all or a part of the first sub-channel in each resource block set among allocated sub-channels for PSSCH transmission. In detail, whether the PSCCH is repeatedly transmitted in a resource block set of any location may be (pre)configured based on whether the PSCCH is repeatedly transmitted for any resource block set and/or the first allocated resource block set. Alternatively, whether the PSCCH is capable of being repeatedly transmitted for which sub-channel among the allocated sub-channels (or sub-channels included in the resource pool) may be (pre)configured. For example, the first SCI may include an indication value for which PSCCH is transmitted with respect to PSSCH transmission, an indication value for which resource block set among the allocated resource block sets, and/or an offset value between the LOWEST sub-channel (an RB or a resource block set) indexes of the PSSCH. In the above method, when receiving the first SCI, the RX UE may divide and determine the number of sub-channels at a time of receiving the first SCI as the number of sub-channels for reserved resources indicated in the received first SCI based on the number of allocated sub-channels and whether the first SCI is transmitted for which PSSCH.

Alternatively, the UE may repeatedly transmit the second SCI for each resource block set among allocated sub-channels for PSSCH transmission. For example, the UE may allocate a sub-channel (or allocated sub-channel) for the PSSCH to a sub-channel group including sub-channels belonging to the same resource block set, and map the second SCI for each sub-channel group.

When an actual PSCCH overhead and second SCI overhead are considered during calculation of the TBS, repetition of the PSCCH and/or the second SCI may limit the maximum value of the TBS. For example, all PSCCH and/or second SCI overhead used for actual transmission for calculation of the TBS may be considered when available REs are calculated. Alternatively, one PSCCH and/or representative second SCI overhead for calculation of the TBS may be considered when available REs are calculated. Alternatively, the representative second SCI overhead value may be a minimum value, a maximum value, or an average value of the second SCI overhead mapped in the allocated resource block set. Here, the average value may be calculated for all resource block sets including (or not including) the second SCI. For example, the average value may be calculated for a resource block set including the second SCI.

Figure 18:
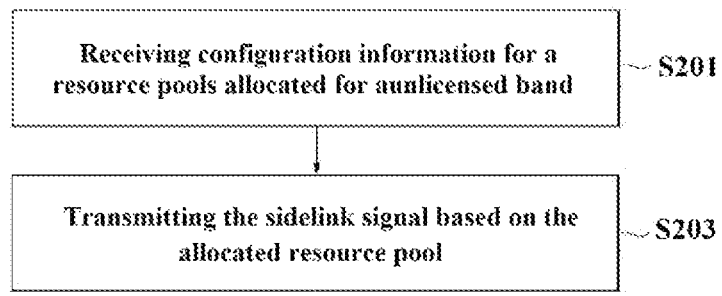
FIG. 18 is a flowchart for explaining a method of transmitting a sidelink signal based on a resource pool allocated for an unlicensed band by a first UE.

FIG. 18 is a flowchart for explaining a method of transmitting a sidelink signal based on a resource pool allocated for an unlicensed band by a first UE.

Referring to FIG. 18, the first UE may receive configuration information for the resource pool allocated for an unlicensed band (S201). In detail, a BS may allocate a resource pool for sidelink communication for a plurality of resource block sets as resources for the unlicensed band and may transmit configuration information for the resource pool to the first UE. That is, the BS may allocate or configure a plurality of sub-channels for sidelink communication for the plurality of resource block sets and may configure or allocate a resource pool including the plurality of sub-channels. The first UE may pre-receive resource information of the unlicensed band for the plurality of resource block sets from the BS, and the plurality of sub-channels may be allocated to have the same frequency size as sub-channels in the licensed band.

Here, the sub-channels included in the resource pool may be independently allocated to each of the plurality of resource block sets. The one sub-channel may be allocated for one resource block set, and may not be allocated to overlap with two or more resource block sets. That is, one sub-channel may not be allocated for two or more resource block sets. For example, the resource pool may include first sub-channels independently allocated only for the first resource block set, second sub-channels independently allocated only for the second resource block set, and third sub-channels independently allocated only for the third resource block set, and may not include a sub-channel allocated through the first resource block set and the second resource block set.

Alternatively, the configuration information may allocate or specify the resource pool or sub-channels included in the resource pool through frequency offset information related to the plurality of resource block sets. The frequency offset may be an interval to start frequencies of the sub-channels from a specific resource block (or a first resource block or a first subcarrier) included in a preconfigured resource block set (e.g., the first set of resource blocks with the lowest frequency) among the plurality of resource block sets. In this case, the first UE may specify or may be allocated the start frequencies of the sub-channels based on the frequency offset, and may specify a plurality of sub-channels c from the start frequencies according to the frequency offset. In this case, since one sub-channel is not allocated on two or more resource block sets as described above, the first UE may determine or specify the plurality of sub-channels except for at least one sub-channel passing through the two resource block sets to be allocated as the resource pool.

Alternatively, the frequency offset may be an offset for each of the plurality of resource block sets, and may be an interval between start frequencies of sub-channels allocated in response to the resource block set from a specific resource block (or a first resource block or a first subcarrier) of each resource block set.

Then, the first UE may transmit the sidelink signal based on the allocated resource pool (S203). As described above, the sidelink signal may be a signal for sidelink communication, such as a PSCCH, a PSSCH, a PSSS, or an SSSS. Alternatively, the sidelink signal may include at least one of a Physical Sidelink control Channel (PSCCH), a Physical Sidelink Shared Channel (PSSCH), and a Physical Sidelink Control Channel (PSFCH). Here, the PSCCH may be transmitted continuously in the frequency domain with the PSSCH. Alternatively, the first UE may pre-receive resource information for a plurality of resource block sets for the unlicensed band from the BS and may allocate or specify sub-channels included in the resource pool based on information such as a frequency offset or the number of sub-channels included in the configuration information. As described above, the first UE may perform channel sensing on the plurality of resource block sets and may transmit the sidelink signal using sub-channels allocated for at least one resource block set of which channel sensing result is determined to be IDLE.

As described above, since sub-channels of the same frequency size are allocated in one resource block set, there may be remaining resource blocks to which the sub-channel is not allocated in the one resource block set. In this case, since a sub-channel for transmission of the sidelink signal is not allocated to the remaining resource block, the first UE may not transmit a sidelink signal using the remaining resource block in principle. However, when the sidelink signal needs to be transmitted only from continuous frequency resources (that is, when frequency continuity is ensured only when the remaining resource block is used) and the resource block set including the remaining resource block and the resource block set adjacent to the remaining resource block are IDLE, the first UE may transmit the sidelink signal using up to the remaining resource block as an exception. Alternatively, when a guard band is included between the resource block set and the adjacent resource block set, the first UE may transmit the sidelink signal using the remaining block and the guard band if the above-described exception condition is satisfied.

Figure 19:
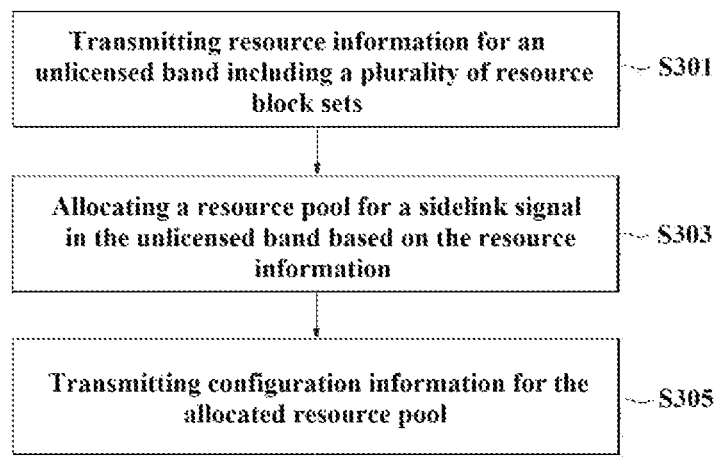
FIG. 19 is a flowchart for explaining a method of allocating a resource pool for sidelink communication for an unlicensed band by a BS.

FIG. 19 is a flowchart for explaining a method of allocating a resource pool for sidelink communication for an unlicensed band by a BS.

Referring to FIG. 19, the BS may transmit resource information for the unlicensed band including a plurality of resource block sets to the first UE (S301). As described above, the unlicensed band may configure a plurality of resource block sets, and the resource information may include information about frequency, time resources and/or regulations for the plurality of resource block sets.

Then, the BS may allocate a resource pool on which transmission and reception of the sidelink signal is to be performed in an unlicensed band based on the resource information (S303).

In detail, the BS may allocate or configure a plurality of sub-channels for sidelink communication for the plurality of resource block sets and may configure or allocate a resource pool including the plurality of sub-channels. Here, the plurality of sub-channels may be allocated to have the same frequency size in a licensed band. Sub-channels included in the resource pool may be independently allocated for each of the plurality of resource block sets. The one sub-channel may be allocated for one resource block set, and may not be allocated to overlap with two or more resource block sets. That is, one sub-channel may not be allocated for two or more resource block sets. For example, the resource pool may include first sub-channels independently allocated only for the first resource block set, second sub-channels independently allocated only for the second resource block set, and third sub independently allocated only for the third resource block set, and may not include a sub-channel allocated through the first resource block set and the second resource block set.

Then, the BS may transmit configuration information for the resource pool to the first UE (S305). As described above, the configuration information may include the resource pool and information for allocating or identifying sub-channels included in the resource pool. As described above, the sidelink signal of the resource pool may be configured for at least one of a Physical Sidelink control Channel (PSCCH), a Physical Sidelink Shared Channel (PSSCH), and a Physical Sidelink Control Channel (PSFCH).

In detail, the BS may transmit the configuration information including the resource pool or information on a frequency offset for allocating or specifying sub-channels included in the resource pool to the first UE. The frequency offset may be an interval to start frequencies of the sub-channels from a specific resource block (or a first resource block or a first subcarrier) included in a pre-configured resource block set (e.g., the first resource block set with the lowest frequency) among the plurality of resource block sets. For example, the BS may indicate start frequencies of the sub-channels through the frequency offset and may allocate a resource pool continuous from the start frequency to the first UE. Here, since one sub-channel is not allocated on two or more resource block sets as described above, the resource pool may include the remaining sub-channels except for at least one sub-channel across two resource block sets among the continuous sub-channels.

Alternatively, the BS may transmit the configuration information including information for a frequency offset corresponding to each of the plurality of resource block sets to the first UE. For example, the BS may configure a frequency offset (and/or the number of sub-channels) based on a specific frequency (e.g., start or end frequency of a first resource block) of each resource block set for each resource block set and may transmit the configuration information including a frequency offset (and/or the number of sub-channels) corresponding to each resource block set to the first UE. In this case, the first UE may specify or identify sub-channels corresponding to respective resource block sets based on the frequency offset (and/or the number of sub-channels) corresponding to each resource block set.

Alternatively, the BS may transmit information about a condition for allowing use of the remaining resource block and/or guard band for each of the resource block sets to the first UE. For example, transmission of a sidelink signal using the remaining resource block may not be allowed in principle, but the sidelink signal may need to be transmitted only in continuous frequency resources (i.e., when frequency continuity is ensured only when the remaining resource block is used), and only when a resource block set including the remaining resource block and a resource block set adjacent to the remaining resource block are IDLE (i.e., the condition for allowing use), transmission of a sidelink signal using up to the remaining resource block may be exceptionally allowed.

As described above, according to the proposed disclosure, the size of the sub-channel for the sidelink signal may be maintained constant even if some resource block sets are selected by a sensing operation for an unlicensed band by allocating a sub-channel for each resource block set for the unlicensed band. In addition, according to the proposed disclosure, frequencies between a resource block set and the sub-channel may be aligned in consideration of the size of the resource block set for the unlicensed band or a guard interval through the frequency offset, thereby ensuring the frequency continuity of the sidelink communication. Furthermore, according to the proposed disclosure, as a sub-channel is allocated for each resource block set for the unlicensed band and a frequency with a resource block set for the unlicensed band is aligned, a condition of use of the remaining resource blocks may be separately defined to increase resource use efficiency for the unlicensed band. In addition, according to the proposed disclosure, when it is difficult to ensure the same value between initial transmission and retransmission during calculation of a transport block size (TBS) due to use of the remaining resource blocks, a sub-channel with a different size may be disregarded and the TBS may be calculated. In addition, according to the proposed disclosure, when some resource block sets in which control information is to be transmitted is Busy by repeatedly transmitting sidelink control information (first sidelink control information and/or second sidelink control information), control information may also be ensured through other resource block sets by considering that some resource block sets in an unlicensed band are Busy.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 20:
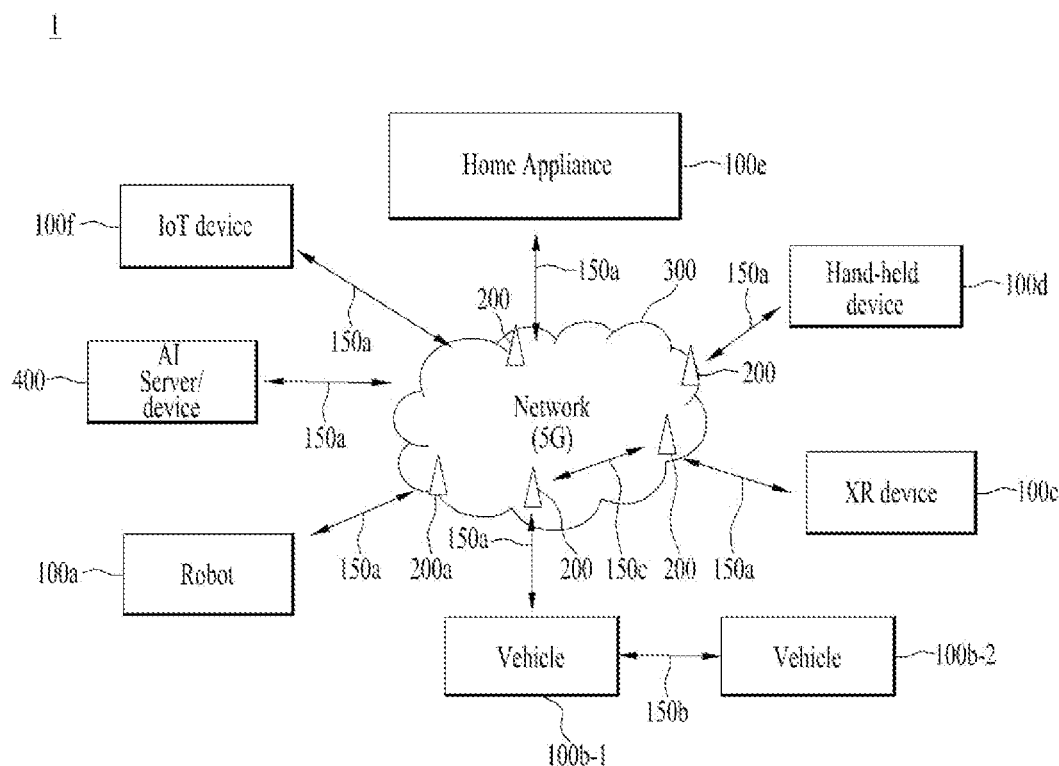
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 21:
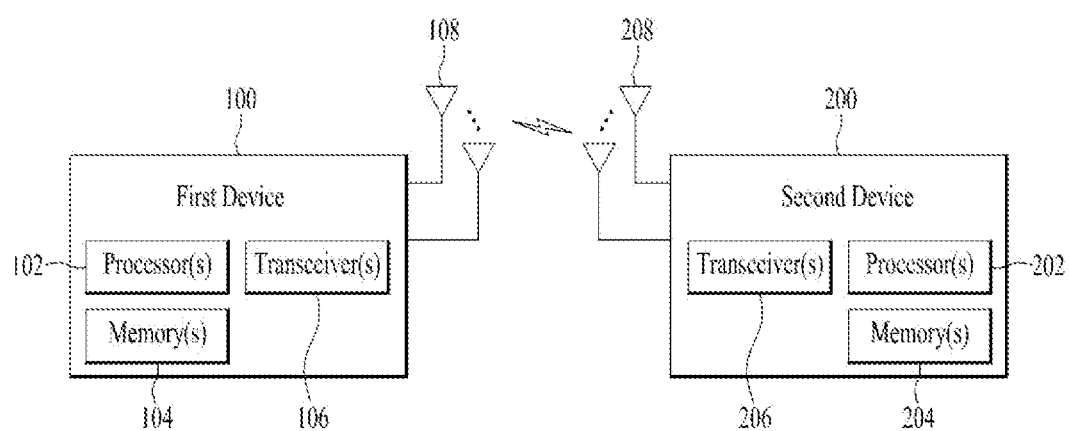
FIG. 21 illustrates wireless devices applicable to the present disclosure.

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the first wireless device 100 or the first UE may include the processor 102 and the memory 104 connected to the RF transceiver. The memory 104 may include at least one program for executing an operation related to the embodiments described with reference to FIGS. 15 to 19.

The processor 102 may control the transceiver 106 to receive configuration information for a resource pool allocated for the unlicensed band and to transmit the sidelink signal based on sub-channels included in the resource pool, the unlicensed band may include a plurality of resource block sets, and the sub-channels may be independently allocated for each of the plurality of resource block sets. The processor 102 may perform the operations described with reference to FIGS. 15 to 19 based on the program included in the memory 104.

Alternatively, a chip set including the processor 102 and the memory 104 may be configured. In this case, the chip set may include at least one processor and at least one memory operatively connected to the at least one processor and configured to cause the at least one processor to perform an operation when being executed, the operation including receiving configuration information for a resource pool allocated for the unlicensed band, and transmitting the sidelink signal based on sub-channels included in the resource pool, and in this case, the unlicensed band may include a plurality of resource block sets, and the sub-channels may be independently allocated for each of the plurality of resource block sets. The operations described with reference to FIGS. 15 to 19 may be performed based on the program included in the memory 104.

A computer-readable storage medium including at least one computer program for causing the at least one processor to perform an operation may be provided, the operation including receiving configuration information for a resource pool allocated for the unlicensed band, and transmitting the sidelink signal based on sub-channels included in the resource pool, and in this case, the unlicensed band may include a plurality of resource block sets, and the sub-channels may be independently allocated for each of the plurality of resource block sets.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

In detail, the second wireless device 200 or the second UE may include the processor 202 and the memory 204 connected to the transceiver 206. The memory 204 may include at least one program for performing an operation related to the embodiments described with reference to FIGS. 15 to 19.

The processor 202 may control the transceiver 206 to transmit resource information for an unlicensed band including a plurality of resource block sets and to transmit configuration information for the resource pool allocated based on the resource information, and the resource pool may include sub-channels independently allocated for each of the plurality of resource block sets. The processor 202 may perform the operations described with reference to FIGS. 15 to 19 based on the program included in the memory 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 22:
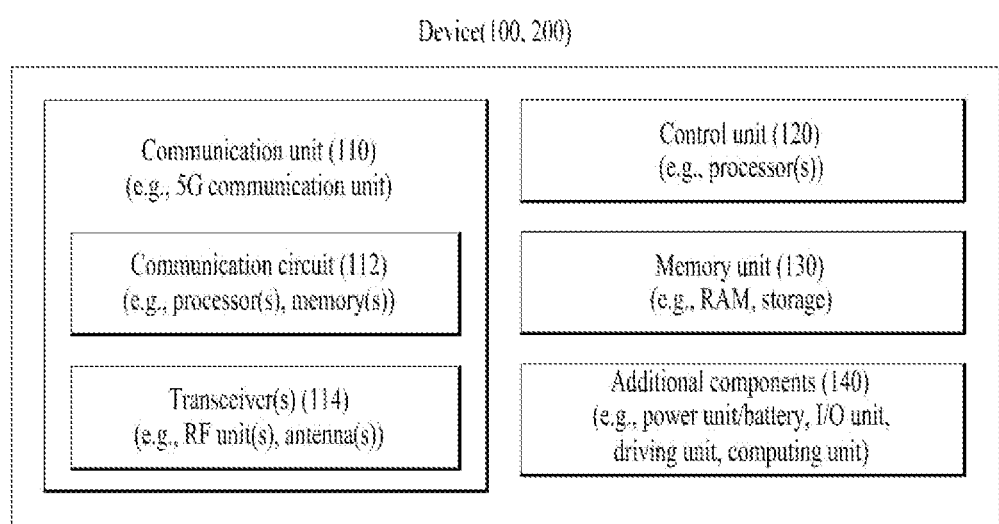
FIG. 22 illustrates another example of a wireless device to which the present disclosure is applied.

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BS s (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 23:
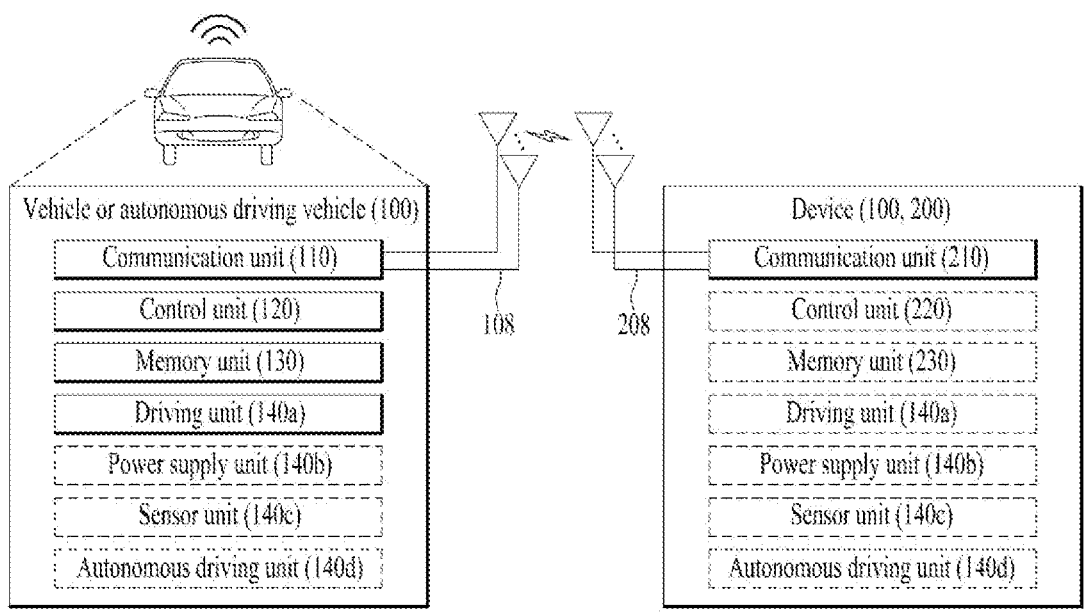
FIG. 23 illustrates a vehicle or an autonomous driving vehicle applied to the present disclosure.

Examples of Vehicles or Autonomous Vehicles to which the Present Disclosure is Applied FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The above-described embodiments of the present disclosure are applicable to various mobile communication systems.

According to various embodiments, the size of the sub-channel for the sidelink signal may be maintained constant even if some resource block sets are selected by a sensing operation for an unlicensed band by allocating a sub-channel for each resource block set for the unlicensed band.

In addition, frequencies between a resource block set and the sub-channel may be aligned in consideration of the size of the resource block set for the unlicensed band or a guard interval through the frequency offset, thereby ensuring the frequency continuity of the sidelink communication.

In addition, as a sub-channel is allocated for each resource block set for the unlicensed band and a frequency with a resource block set for the unlicensed band is aligned, a condition of use of the remaining resource blocks may be separately defined to increase resource use efficiency for the unlicensed band.

In addition, when it is difficult to ensure the same value between initial transmission and retransmission during calculation of a transport block size (TBS) due to use of the remaining resource blocks, a sub-channel with a different size may be disregarded and the TBS may be calculated.

In addition, when some resource block sets in which control information is to be transmitted is Busy by repeatedly transmitting sidelink control information (first sidelink control information and/or second sidelink control information), control information may also be ensured through other resource block sets by considering that some resource block sets in an unlicensed band are Busy.

Effects to be achieved by embodiment(s) are not limited to what has been particularly described hereinabove and other effects not mentioned herein will be more clearly understood by persons skilled in the art to which embodiment(s) pertain from the following detailed description.

What is claimed is:

1. A method of transmitting a sidelink signal in an unlicensed band by a first user equipment (UE) in a wireless communication system for supporting sidelink communication, the method comprising:

receiving configuration information for a resource pool allocated for the unlicensed band, wherein the unlicensed band includes a plurality of resource block sets;

performing a channel sensing on the unlicensed band in a unit of resource block set; and based on the channel sensing, transmitting the sidelink signal based on sub-channels included in the resource pool, wherein the sidelink signal includes at least one of a Physical Sidelink Control Channel (PSCCH), a Physical Sidelink Shared Channel (PSSCH), or a Physical Sidelink Control Channel (PSFCH), wherein the sub-channels are allocated for each of the plurality of resource block sets, wherein each of the sub-channels is allocated to not overlap two or more resource block sets.

2. The method of claim 1, wherein the resource pool is allocated based on a frequency offset included in the configuration information.

3. The method of claim 2, wherein the frequency offset is an interval between start frequencies of sub-channels from a first resource block of a pre-configured resource block set among the plurality of resource block sets.

4. The method of claim 3, wherein the sub-channels are a plurality of sub-channels continuous on a frequency domain from the start frequency, except for at least one sub-channel overlapping the two or more resource block sets.

5. The method of claim 1, wherein the configuration information includes information on a frequency offset for allocating the sub-channels for each resource block set.

6. The method of claim 1, wherein the resource block set includes at least one remaining resource block to which the sub-channels are not allocated.

7. The method of claim 6, wherein the first UE transmits the sidelink signal using the remaining resource block as well based on that transmission of the sidelink signal is allowed only in a continuous frequency resource and both a first resource block set including the remaining resource block and a second resource block set adjacent to the remaining resource block are in an idle state.

8. The method of claim 1, wherein the sub-channels have the same frequency size.

9. A first user equipment (UE) for transmitting a sidelink signal in an unlicensed band in a wireless communication system for supporting sidelink communication, comprising:

a radio frequency (RF) transceiver; and a processor connected to the RF transceiver, wherein the processor controls the RF transceiver to:

receive configuration information for a resource pool allocated for the unlicensed band, wherein the unlicensed band includes a plurality of resource block sets; and perform a channel sensing on the unlicensed band in a unit of resource block set; and based on the channel sensing, transmit the sidelink signal based on sub-channels included in the resource pool, wherein the sidelink signal includes at least one of a Physical Sidelink Control Channel (PSCCH), a Physical Sidelink Shared Channel (PSSCH), or a Physical Sidelink Control Channel (PSFCH), wherein the sub-channels are allocated for each of the plurality of resource block sets, wherein each of the sub-channels is allocated to not overlap two or more resource block sets.

* * * * *